(12) United States Patent
Bora et al.

(10) Patent No.: US 10,818,164 B2
(45) Date of Patent: Oct. 27, 2020

(54) WIRELESS CONTROL DEVICE AND METHODS THEREOF

(71) Applicant: ILUMI SOLUTIONS, INC., Dallas, TX (US)

(72) Inventors: Swapnil Bora, Dallas, TX (US); Corey Egan, Austin, TX (US); Qinghui Tang, Plano, TX (US)

(73) Assignee: ILUMI SOLUTIONS, INC., Dallas, TX (US)

( * ) Notice: Subject to any disclaimer, the term of this patent is extended or adjusted under 35 U.S.C. 154(b) by 64 days.

(21) Appl. No.: 16/201,106

(22) Filed: Nov. 27, 2018

(65) Prior Publication Data
US 2019/0180608 A1 Jun. 13, 2019

Related U.S. Application Data

(60) Division of application No. 15/204,990, filed on Jul. 7, 2016, now Pat. No. 10,339,796, which is a
(Continued)

(51) Int. Cl.
*G06F 3/02* (2006.01)
*G06F 5/00* (2006.01)
(Continued)

(52) U.S. Cl.
CPC .......... *G08C 17/02* (2013.01); *G06F 3/0652* (2013.01); *G06F 3/0679* (2013.01);
(Continued)

(58) Field of Classification Search
CPC ............... G08C 17/02; G08C 2201/12; G08C 2201/30; G08C 2201/93; H02J 13/00019;
(Continued)

(56) References Cited

U.S. PATENT DOCUMENTS

| 543,280 A | 7/1895 | Westinghouse, Jr. |
| 5,193,208 A | 3/1993 | Yokota et al. |

(Continued)

FOREIGN PATENT DOCUMENTS

| JP | 2003-241714 A | 8/2003 |
| JP | 2004-093761 A | 3/2004 |

(Continued)

OTHER PUBLICATIONS

European Patent Office, Partial European Search Report for Appl. No. EP 16821999.6, dated Dec. 17, 2018, 23 pp.

(Continued)

*Primary Examiner* — Dionne Pendleton
(74) *Attorney, Agent, or Firm* — Daniel J. Chalker; Edwin S. Flores; Chalker Flores, LLP

(57) ABSTRACT

A wireless control device includes a power source, one or more sensors, one or more switches, a wireless transceiver circuit, an antenna connected to the wireless transceiver circuit, and a processor communicably coupled to the power source, the one or more sensors, the one or more switches, and the wireless transceiver circuit. The processor receives a data from the one or more sensors or the one or more switches, determines a pre-defined action associated with the data that identifies one or more external devices and one or more tasks, and transmits one or more control signals via the wireless transceiver circuit and the antenna that instruct the identified external device(s) to perform the identified task(s).

16 Claims, 15 Drawing Sheets

Related U.S. Application Data continuation-in-part of application No. 29/550,417, filed on Jan. 4, 2016, now abandoned.

(60) Provisional application No. 62/274,759, filed on Jan. 4, 2016, provisional application No. 62/189,637, filed on Jul. 7, 2015.

(51) Int. Cl.
| | |
|---|---|
| *G06F 13/16* | (2006.01) |
| *G06F 13/12* | (2006.01) |
| *G06F 5/14* | (2006.01) |
| *G08C 17/02* | (2006.01) |
| *H04B 1/40* | (2015.01) |
| *H04L 29/08* | (2006.01) |
| *H02J 13/00* | (2006.01) |
| *G06F 3/06* | (2006.01) |
| *G06F 9/30* | (2018.01) |

(52) U.S. Cl.
CPC .... *G06F 9/30101* (2013.01); *H02J 13/00019* (2020.01); *H02J 13/0075* (2013.01); *H04B 1/40* (2013.01); *H04L 67/025* (2013.01); *G06F 2205/126* (2013.01); *G06F 2212/452* (2013.01); *G08C 2201/12* (2013.01); *G08C 2201/30* (2013.01); *G08C 2201/93* (2013.01)

(58) Field of Classification Search
CPC ....... H02J 13/0075; H04B 1/40; H04B 1/708; H04B 1/7105; H04L 67/025; H04L 1/0045; H04L 1/0072; H04L 43/0817; H04L 43/16; H04L 63/1408; H04L 63/1458; H04L 67/02; H04L 67/1008; G06F 12/0246; G06F 12/0875; G06F 12/1408; G06F 12/1458; G06F 13/1673; G06F 13/4243; G06F 15/78; G06F 21/50; G06F 21/51; G06F 21/52; G06F 21/554; G06F 21/56; G06F 21/564; G06F 21/568; G06F 21/6218; G06F 2205/126; G06F 2212/1052; G06F 2212/402; G06F 2212/452; G06F 3/0604; G06F 3/0608; G06F 3/0652; G06F 3/0679; G06F 5/06; G06F 5/14; G06F 9/30072; G06F 9/30098; G06F 9/30101; G06F 9/3867

See application file for complete search history.

(56) References Cited

U.S. PATENT DOCUMENTS

| | | | |
|---|---|---|---|
| 6,016,038 A | 1/2000 | Mueller et al. | |
| 6,028,871 A | 2/2000 | Vaughan et al. | |
| 6,069,465 A | 5/2000 | De Boois et al. | |
| 6,150,774 A | 11/2000 | Mueller et al. | |
| 6,166,496 A | 12/2000 | Lys et al. | |
| 6,211,626 B1 | 4/2001 | Lys et al. | |
| 6,292,901 B1 | 9/2001 | Lys et al. | |
| 6,459,919 B1 | 10/2002 | Lys et al. | |
| 6,528,954 B1 | 3/2003 | Lys et al. | |
| 6,548,967 B1 | 4/2003 | Dowling et al. | |
| 6,577,080 B2 | 6/2003 | Lys et al. | |
| 6,608,453 B2 | 8/2003 | Morgan et al. | |
| 6,655,817 B2 | 12/2003 | Devlin et al. | |
| 6,720,745 B2 | 4/2004 | Lys et al. | |
| 6,746,139 B2 | 6/2004 | Sinzawa et al. | |
| 6,777,891 B2 | 8/2004 | Lys et al. | |
| 6,788,011 B2 | 9/2004 | Mueller et al. | |
| 6,806,659 B1 | 10/2004 | Mueller et al. | |
| 6,950,656 B1 | 9/2005 | Bahk et al. | |
| 6,965,205 B2 | 11/2005 | Piepgras et al. | |
| 6,967,448 B2 | 11/2005 | Morgan et al. | |
| 7,014,336 B1 | 3/2006 | Ducharme et al. | |
| 7,038,398 B1 | 5/2006 | Lys et al. | |
| 7,038,399 B2 | 5/2006 | Lys et al. | |
| 7,079,808 B2 | 7/2006 | Striemer | |
| 7,113,541 B1 | 9/2006 | Lys et al. | |
| 7,126,291 B2 | 10/2006 | Kruse et al. | |
| 7,167,777 B2 | 1/2007 | Budike, Jr. | |
| 7,186,003 B2 | 3/2007 | Dowling et al. | |
| 7,202,613 B2 | 4/2007 | Morgan et al. | |
| 7,228,190 B2 | 6/2007 | Dowling et al. | |
| 7,231,060 B2 | 6/2007 | Dowling et al. | |
| 7,303,300 B2 | 12/2007 | Dowling et al. | |
| 7,308,296 B2 | 12/2007 | Rys et al. | |
| 7,332,878 B1 | 2/2008 | Smith | |
| 7,348,736 B2 | 3/2008 | Piepgras et al. | |
| 7,348,949 B2 | 3/2008 | Lys et al. | |
| 7,352,339 B2 | 4/2008 | Morgan et al. | |
| 7,353,071 B2 | 4/2008 | Blackwell et al. | |
| 7,358,679 B2 | 4/2008 | Lys et al. | |
| 7,378,805 B2 | 5/2008 | Oh et al. | |
| 7,384,150 B2 | 6/2008 | Prince | |
| 7,385,359 B2 | 6/2008 | Dowling et al. | |
| 7,401,934 B2 | 7/2008 | Hunt | |
| 7,436,132 B1 | 10/2008 | Null | |
| 7,462,103 B2 | 12/2008 | Mattice et al. | |
| 7,462,997 B2 | 12/2008 | Mueller et al. | |
| 7,471,051 B1 | 12/2008 | Wacknov et al. | |
| 7,476,002 B2 | 1/2009 | Wolf et al. | |
| 7,482,763 B2 | 1/2009 | Rodriguez et al. | |
| 7,490,957 B2 | 2/2009 | Leong et al. | |
| 7,508,141 B2 | 3/2009 | Wong | |
| 7,511,695 B2 | 3/2009 | Furukawa et al. | |
| 7,518,319 B2 | 4/2009 | Konno et al. | |
| 7,550,931 B2 | 6/2009 | Lys et al. | |
| 7,597,455 B2 | 10/2009 | Smith et al. | |
| 7,612,843 B2 | 11/2009 | Chou | |
| 7,619,538 B1 | 11/2009 | Zarian | |
| 7,623,042 B2 | 11/2009 | Huizenga | |
| 7,652,236 B2 | 1/2010 | Cortenraad et al. | |
| 7,658,506 B2 | 2/2010 | Dowling | |
| 7,659,674 B2 | 2/2010 | Mueller et al. | |
| 7,675,238 B2 | 3/2010 | Cortenraad et al. | |
| 7,701,078 B1 | 4/2010 | Johnson et al. | |
| 7,712,914 B2 | 5/2010 | Levy et al. | |
| 7,719,208 B2 | 5/2010 | Li et al. | |
| 7,731,371 B2 | 6/2010 | Prince | |
| 7,731,383 B2 | 6/2010 | Myer | |
| 7,745,769 B2 | 6/2010 | Tracy et al. | |
| 7,764,026 B2 | 7/2010 | Dowling et al. | |
| 7,777,427 B2 | 8/2010 | Stalker, III | |
| 7,777,430 B2 | 8/2010 | Catalano et al. | |
| 7,781,713 B2 | 8/2010 | Papamichael et al. | |
| 7,781,979 B2 | 8/2010 | Lys | |
| 7,809,448 B2 | 10/2010 | Lys et al. | |
| 7,812,297 B2 | 10/2010 | Blaut et al. | |
| 7,818,029 B2 | 10/2010 | Sanguinetti | |
| 7,845,823 B2 | 12/2010 | Mueller et al. | |
| 7,856,152 B2 | 12/2010 | Diederiks et al. | |
| 7,861,298 B1 * | 12/2010 | Giallorenzi | H04B 1/708 726/22 |
| 7,863,829 B2 | 1/2011 | Sayers et al. | |
| 7,863,831 B2 | 1/2011 | Vos | |
| 7,878,671 B2 | 2/2011 | Hunt | |
| 7,893,633 B2 | 2/2011 | Pedersen | |
| 7,914,172 B2 | 3/2011 | Nagara et al. | |
| 7,919,937 B2 | 4/2011 | Tracy et al. | |
| 7,920,053 B2 | 4/2011 | Pattok et al. | |
| 7,926,975 B2 | 4/2011 | Siemiet et al. | |
| 7,936,562 B2 | 5/2011 | Nagamura et al. | |
| 7,936,904 B2 | 5/2011 | Furusawa | |
| 7,946,729 B2 | 5/2011 | Ivey et al. | |
| 7,961,113 B2 | 6/2011 | Rabiner et al. | |
| 7,972,022 B2 | 7/2011 | Pohlert et al. | |
| 7,972,028 B2 | 7/2011 | Durand et al. | |
| 7,976,196 B2 | 7/2011 | Ivey et al. | |
| 7,990,080 B2 | 8/2011 | Chang et al. | |
| 7,999,491 B2 | 8/2011 | Peng et al. | |
| 8,004,211 B2 | 8/2011 | Van Erp | |
| 8,008,871 B2 | 8/2011 | Wang et al. | |
| 8,013,545 B2 | 9/2011 | Jonsson | |

(56) References Cited

U.S. PATENT DOCUMENTS

| | | |
|---|---|---|
| 8,016,470 B2 | 9/2011 | Li et al. |
| 8,021,021 B2 | 9/2011 | Paolini |
| 8,025,417 B2 | 9/2011 | Pohlert et al. |
| 8,026,673 B2 | 9/2011 | Lys |
| 8,029,154 B2 | 10/2011 | Myer |
| 8,035,320 B2 | 10/2011 | Sibert |
| 8,035,609 B2 | 10/2011 | Kerr et al. |
| 8,049,434 B2 | 11/2011 | Crouse et al. |
| 8,049,437 B2 | 11/2011 | Chang et al. |
| 8,070,325 B2 | 12/2011 | Zampini et al. |
| 8,093,823 B1 | 1/2012 | Ivey et al. |
| 8,100,552 B2 | 1/2012 | Spero |
| 8,143,811 B2 | 3/2012 | Shloush et al. |
| 8,169,163 B2 | 5/2012 | Kang et al. |
| 8,203,260 B2 | 6/2012 | Li et al. |
| 8,299,716 B2 | 10/2012 | Melzner et al. |
| 8,324,832 B2 | 12/2012 | Yan et al. |
| 8,326,136 B1 | 12/2012 | Clark |
| 8,344,659 B2 | 1/2013 | Shimomura et al. |
| 8,362,707 B2 | 1/2013 | Draper et al. |
| 8,378,588 B2 | 2/2013 | Kuo et al. |
| 8,410,717 B2 | 4/2013 | Shyteynberg et al. |
| 8,421,376 B2 | 4/2013 | Jonsson |
| 8,427,063 B2 | 4/2013 | Hulett |
| 8,430,402 B2 | 4/2013 | Diehl et al. |
| 8,441,210 B2 | 5/2013 | Shteynberg et al. |
| 8,482,223 B2 | 7/2013 | Draper et al. |
| 8,531,137 B2 | 9/2013 | Jonsson |
| 8,581,521 B2 | 11/2013 | Welten et al. |
| 8,638,045 B2 | 1/2014 | Kunst et al. |
| 8,669,716 B2 | 3/2014 | Recker et al. |
| 8,729,826 B2 | 5/2014 | Jonsson |
| 8,742,694 B2 | 6/2014 | Bora et al. |
| 8,764,242 B2 | 7/2014 | Recker et al. |
| 8,770,771 B2 | 7/2014 | Preta et al. |
| 8,845,116 B2 | 9/2014 | Kim et al. |
| 8,890,435 B2 | 11/2014 | Bora et al. |
| 8,896,218 B2 | 11/2014 | Bora et al. |
| 8,896,232 B2 | 11/2014 | Bora et al. |
| 8,921,751 B2 | 12/2014 | Verfuerth |
| 8,922,126 B2 | 12/2014 | Bora et al. |
| 8,981,646 B2 | 3/2015 | Kim |
| 9,113,528 B2 | 8/2015 | Bora et al. |
| 9,161,419 B2 | 10/2015 | Anderson et al. |
| 9,204,523 B2 | 12/2015 | Reed et al. |
| 9,252,595 B2 | 2/2016 | Recker et al. |
| 9,295,144 B2 | 3/2016 | Bora et al. |
| 9,386,659 B2 | 7/2016 | Sinai et al. |
| 9,642,100 B2 | 5/2017 | Yamamoto et al. |
| 10,133,549 B1 * | 11/2018 | Do ............................ G06F 5/14 |
| 10,178,723 B2 | 1/2019 | Van De Ven |
| 2002/0093492 A1 | 7/2002 | Baron |
| 2004/0042234 A1 | 3/2004 | Otake |
| 2005/0043907 A1 | 2/2005 | Eckel et al. |
| 2005/0204505 A1 | 9/2005 | Kashiwagi |
| 2007/0004349 A1 | 1/2007 | Ranganathan et al. |
| 2007/0075965 A1 | 4/2007 | Huppi et al. |
| 2007/0133469 A1 | 6/2007 | Shin et al. |
| 2009/0111499 A1 | 4/2009 | Bosch et al. |
| 2009/0129341 A1 | 5/2009 | Balasubramanian et al. |
| 2009/0286534 A1 | 11/2009 | Garg et al. |
| 2009/0291690 A1 | 11/2009 | Guvenc et al. |
| 2010/0001648 A1 | 1/2010 | De Clercq et al. |
| 2010/0188197 A1 | 7/2010 | Ackley |
| 2010/0237711 A1 | 9/2010 | Parsons |
| 2010/0244709 A1 | 9/2010 | Steiner et al. |
| 2010/0285807 A1 | 11/2010 | Miller-Smith |
| 2011/0179853 A1 | 7/2011 | Fugiel et al. |
| 2012/0155317 A1 | 6/2012 | Shepard et al. |
| 2012/0286676 A1 | 11/2012 | Saveri, III et al. |
| 2013/0026947 A1 | 1/2013 | Economy et al. |
| 2013/0247117 A1 | 9/2013 | Yamada et al. |
| 2013/0315038 A1 | 11/2013 | Ferren et al. |
| 2014/0001846 A1 | 1/2014 | Mosebrook et al. |
| 2014/0021385 A1 | 1/2014 | Lynch |
| 2014/0169795 A1 | 6/2014 | Clough |
| 2014/0197960 A1 | 7/2014 | Taylor, Jr. et al. |
| 2014/0206297 A1 | 7/2014 | Schlub et al. |
| 2014/0239817 A1 | 8/2014 | Leinen et al. |
| 2014/0325287 A1 | 10/2014 | Nair et al. |
| 2014/0340630 A1 | 11/2014 | Pugh et al. |
| 2015/0008831 A1 | 1/2015 | Carrigan et al. |
| 2015/0116811 A1 | 4/2015 | Shrivastava et al. |
| 2015/0120000 A1 | 4/2015 | Coffey et al. |
| 2015/0189724 A1 | 7/2015 | Karc et al. |
| 2015/0371534 A1 | 12/2015 | Dimberg et al. |
| 2017/0013663 A1 | 1/2017 | Bora et al. |
| 2017/0177367 A1 * | 6/2017 | DeHon .................. G06F 9/3867 |
| 2017/0254518 A1 | 9/2017 | Vasylyev |
| 2018/0046807 A1 * | 2/2018 | Patil .................... H04L 43/0817 |
| 2020/0004453 A1 * | 1/2020 | Rori .................... G06F 12/0246 |

FOREIGN PATENT DOCUMENTS

| | | |
|---|---|---|
| JP | 2005-233982 A | 9/2005 |
| KR | 10-0466042 A | 1/2005 |
| KR | 10-2008-0009140 A | 1/2008 |
| KR | 10-2008-0020608 A | 3/2008 |
| KR | 10-1184698 B1 | 9/2012 |
| WO | 2006/114725 A1 | 11/2006 |
| WO | 2012/145766 A2 | 10/2012 |
| WO | 2014027730 A1 | 2/2014 |
| WO | 2017007963 A1 | 1/2017 |
| WO | 2017007976 A1 | 1/2017 |

OTHER PUBLICATIONS

European Patent Office, Partial European Search Report for Appl. No. EP 16821999.6, dated Feb. 11, 2019, 23 pp.

European Patent Office, Supplementary European Search Report for Appl. No. EP 12774216, dated Sep. 9, 2015, 5 pp.

European Patent Office, Partial European Search Report for Appl. No. EP 16821977.2, dated Nov. 14, 2018, 21 pp.

Korean Intellectual Property Office (ISA) International Search Report and Written Opinion for PCT/US2012/037369 dated Nov. 5, 2012, 10 pp.

Korean Intellectual Property Office (ISA) International Search Report and Written Opinion for PCT/US2016/041388 dated Sep. 12, 2016, 17 pp.

Korean Intellectual Property Office (ISA) International Search Report and Written Opinion for PCT/US2016/041388 dated Oct. 18, 2016, 14 pp.

Philips Color Kinetics, "ColorBurst Powercore Product Guide," (2010-2011), 24 pages.

Philips Color Kinetics, "eColor Graze Powercore Product Guide," (2011), 12 pages.

* cited by examiner

Screen for Switch Configuration

Switch Configuration Screen

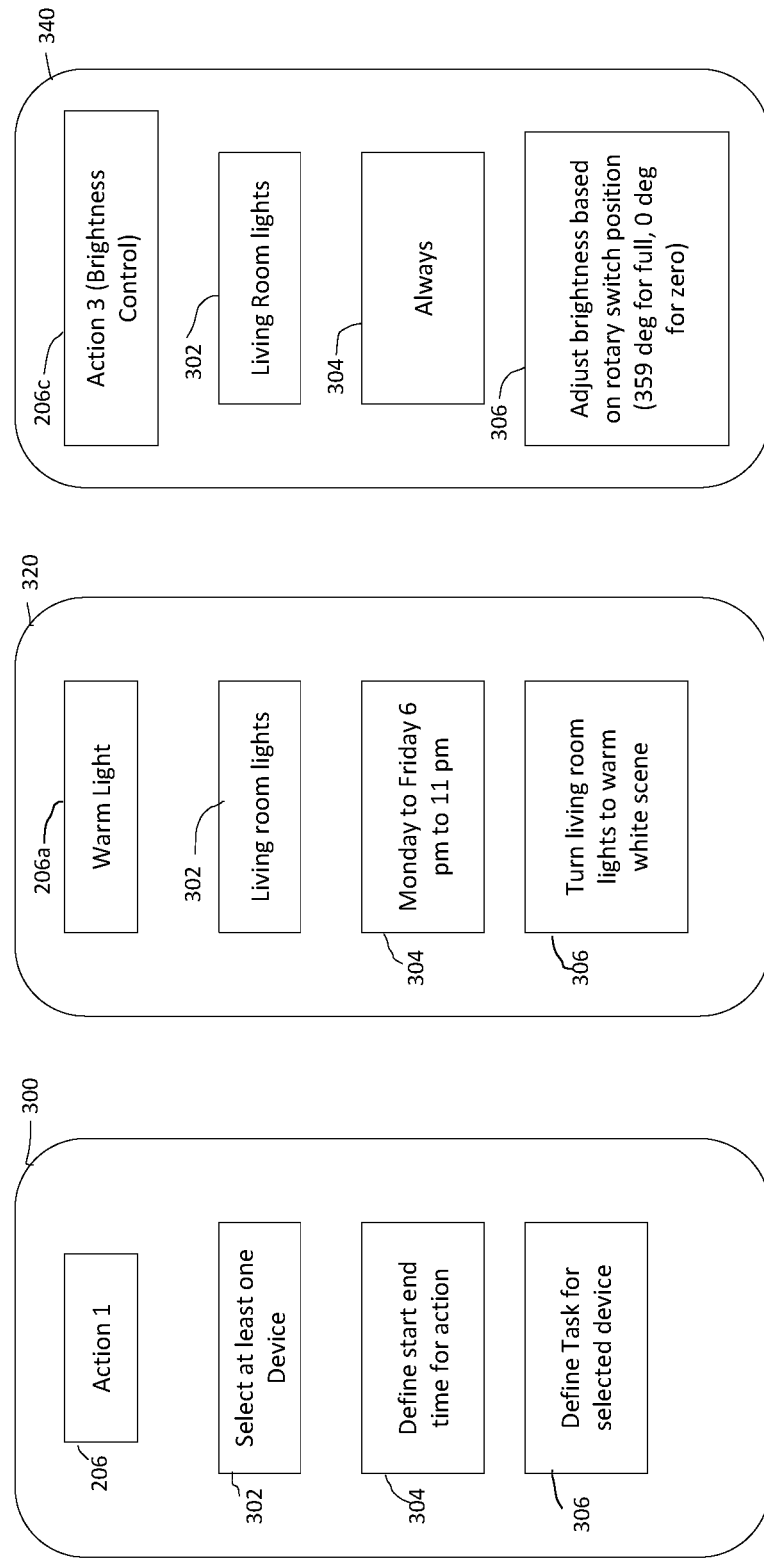

WIRELESS CONTROL DEVICE AND METHODS THEREOF

CROSS-REFERENCE TO RELATED APPLICATIONS

This application claims priority to and is a divisional patent application of U.S. patent application Ser. No. 15/204,990, filed on Jul. 7, 2016, and entitled "Wireless Control Device and Methods Thereof", which is a utility patent application of: (1) U.S. Provisional Patent Application Ser. No. 62/274,759, filed on Jan. 4, 2016, and entitled "Wireless Control Device"; (2) U.S. Provisional Patent Application Ser. No. 62/189,637, filed on Jul. 7, 2015, and entitled "Wireless Lighting Control Methods"; and (3) U.S. design patent application Ser. No. 29/550,417 filed on Jan. 4, 2016, and entitled "Wireless Control Device". The foregoing applications are hereby incorporated by reference in their entirety.

FIELD OF THE INVENTION

The present invention relates generally to the field of electronics and, more particularly, to a wireless control device and methods thereof.

BACKGROUND OF THE INVENTION

None.

SUMMARY OF THE INVENTION

The present invention provides a wireless control device that includes a power source, one or more sensors, one or more switches, a wireless transceiver circuit, an antenna connected to the wireless transceiver circuit, and a processor communicably coupled to the power source, the one or more sensors, the one or more switches, and the wireless transceiver circuit. The processor receives a data from the one or more sensors or the one or more switches, determines a pre-defined action associated with the data that identifies one or more external devices and one or more tasks, and transmits one or more control signals via the wireless transceiver circuit and the antenna that instruct the identified external device(s) to perform the identified task(s).

In addition, the present invention provides a wireless control device that includes a power source, one or more sensors, one or more switches, a real time clock, a wireless transceiver circuit, an antenna connected to the wireless transceiver circuit, and a processor communicably coupled to the power source, the one or more sensors, the one or more switches, the real time clock and the wireless transceiver circuit. The processor receives a data from the one or more sensors or the one or more switches, determines a pre-defined action associated with the data that identifies one or more external devices and one or more tasks, and transmits one or more control signals via the wireless transceiver circuit and the antenna that instruct the identified external device(s) to perform the identified task(s).

Moreover, the present invention provides a method for controlling one or more external devices by providing a wireless control device that includes a housing, a power source disposed in the housing, one or more sensors disposed on or within the housing, one or more switches disposed on or within the housing, a wireless transceiver circuit disposed within the housing, an antenna disposed on or within the housing and connected to the wireless transceiver circuit, a processor disposed within the housing and communicably coupled to the power source, the one or more sensors, the one or more switches, and the wireless transceiver circuit. A data is received from the one or more sensors or the one or more switches. A pre-defined action associated with the data is determined that identifies the one or more external devices and one or more tasks using the processor. One or more control signals are transmitted via the wireless transceiver circuit and the antenna that instruct the identified external device(s) to perform the identified task(s).

In addition, the present invention provides a method for controlling one or more external devices by providing a wireless control device comprising a housing, a power source disposed in the housing, one or more sensors disposed on or within the housing, one or more switches disposed on or within the housing, a wireless transceiver circuit disposed within the housing, an antenna disposed on or within the housing and connected to the wireless transceiver circuit, a processor disposed within the housing and communicably coupled to the power source, the one or more sensors, the one or more switches, and the wireless transceiver circuit. A data is received from the one or more sensors or the one or more switches. A pre-defined action associated with the data is determined that identifies the one or more external devices and one or more tasks using the processor. One or more control signals via the wireless transceiver circuit and the antenna are transmitted that instruct the identified external device(s) to perform the identified task(s).

The present invention also provides a method for resetting a device by providing the device having a counter or timer, a memory and a processor communicably coupled to the counter or timer and the memory, (a) determining a count based on the counter or a time based on the timer, (b) flagging a first defined memory location when the count or time reaches a first milestone, (c) un-flagging the first defined memory location when the count or time reaches a second milestone, (d) turning the device OFF and then ON again, (e) repeating steps (a) through (d) when the first defined memory location is not flagged, (f) determining the count based on the counter or the time based on the timer, (g) flagging a second defined memory location when the count or time reaches the first milestone, (h) un-flagging the second defined memory location when the count or time reaches the second milestone, (i) turning the device OFF and then ON again, (j) repeating steps (a) through (i) when the first defined memory location is not flagged or the second defined memory location is not flagged, (k) determining the count based on the counter or the time based on the timer, (l) flagging a third defined memory location when the count or time reaches the first milestone, (m) un-flagging the third defined memory location when the count or time reaches the second milestone, (n) turning the device OFF and then ON again, (o) repeating steps (a) through (n) when the first defined memory location is not flagged or the second defined memory location is not flagged or the third defined memory location is not flagged, and (p) resetting the device.

Likewise, the present invention provides a method for turning a program ON by providing a device having a counter or timer, a memory and a processor communicably coupled to the counter or timer and the memory, wherein the program causes the processor to perform execute one or more commands when the program is ON, (a) determining a count based on the counter or a time based on the timer, (b) flagging a first defined memory location when the count or time reaches a first milestone, (c) un-flagging the first defined memory location when the count or time reaches a second milestone, (d) repeating steps (a) through (v) when the first defined memory location is not flagged, (e) determining the count based on the counter or the time based on the timer, (f) flagging a second defined memory location when the count or time reaches the first milestone, (g) un-flagging the second defined memory location when the count or time reaches the second milestone, (h) turning the device OFF and then ON again, (i) repeating steps (a) through (h) when the first defined memory location is not flagged or the second defined memory location is not flagged, and (p) turning the program ON.

These and other objects, advantages and features of this invention will be apparent from the following description taken with reference to the accompanying drawing, wherein is shown a preferred embodiment of the invention.

BRIEF DESCRIPTION OF THE DRAWINGS

The above and further advantages of the invention may be better understood by referring to the following description in conjunction with the accompanying drawings, in which:

FIG. 3A is a diagram of a user interface screen for defining an action for the one or more switches in accordance with one embodiment of the present invention;

FIGS. 3B-3C are diagrams of a user interface screen showing examples of action definitions for the one or more switches in accordance with one embodiment of the present invention;

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Figure 1:
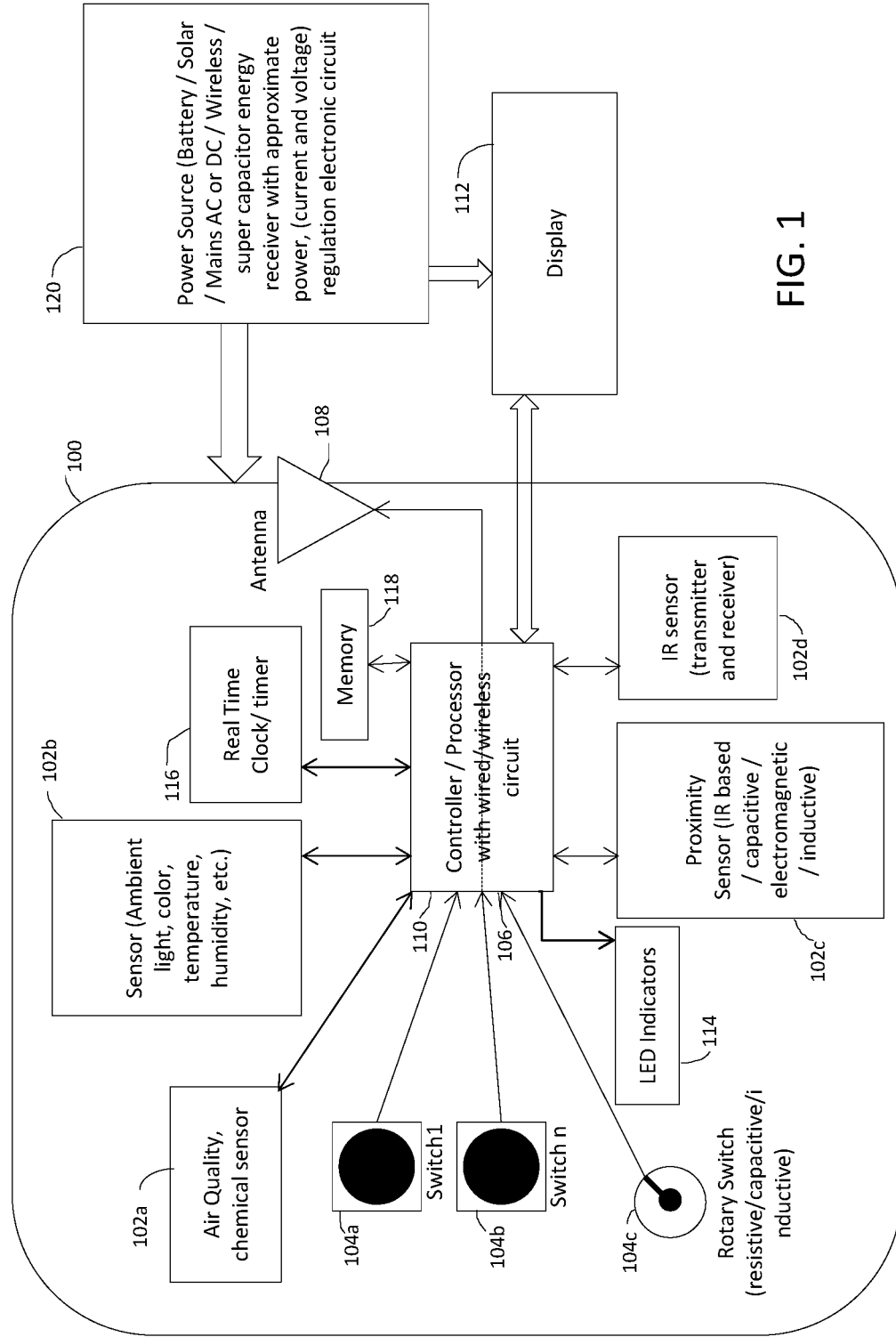
FIG. 1 is a block diagram of a wireless control device in accordance with one embodiment of the present invention.

Now referring to FIG. 1, a block diagram of a wireless control device 100 in accordance with one embodiment of the present invention is shown. Note that the wireless control device 100 may also be referred to as a switch device. The wireless control device 100 includes one or more sensors 102, one or more switches 104, a wireless transceiver circuit 106 with antenna 108, and a processor 110 communicably coupled to the one or more sensors 102, one or more switches 104, and the wireless transceiver circuit 106. The wireless control device 100 can be used for controlling wireless devices over a wireless protocol such as Bluetooth, Wi-Fi, etc. The controller or processor 110 processes the input data, such as from sensors 102, switches 104, and sends commands and data to output devices, such as display 112, wireless transceiver circuit 106, LED indicator(s) 114, etc. For example, the processor 110 receives data from the one or more sensors 102 and/or the one or more switches 104, determines a pre-defined action associated with the data that identifies one or more external devices and one or more tasks, and transmits one or more control signals via the wireless transceiver circuit 106 and the antenna 108 that instruct the identified external device(s) to perform the identified task(s). The display 112 can be used as an input and output device that gives readings, configuration, settings, etc. of the device and also interaction possibility to connect and communicate to the device, updating its software, changing the configuration and settings, etc. The display 112 can be an LCD display, LED display, or other desired display type, etc.

The one or more sensors 102 may include various sensors to measure air quality 102a, ambient light 102b, temperature 102b, humidity 102b, proximity 102c, motion 102d, sound/microphone, etc. The one or more sensors 102 obtain and provide environmental data as an input to the processor 110 for processing. A real time clock 116 maintains the current date and time, and is useful to automate and program the device actions. LED indicators 104 indicate based on the input data, commands sent, actions taken by the processor 110, success or failure of the action, etc. Switches 104 may include different types of switches. For example, push button switches 104a and 104b act as ON/OF triggers to the processor 110, and rotary switch 104c acts as analog input to the analog to digital converter communicably coupled to the processor 110. Memory 118 can be internal or external to the processor 110, volatile or non-volatile, and used to save configurations and other programmable data, such as user defined programs apart from manufacturer defined programs. Wireless circuit 106 can be part of the processor circuit 110 or a separate component communicably coupled with the processor 110. The wireless circuit 106 and antenna 108 are used to communicate to the external wireless devices. Power supply 120 can be a battery (internal or external, rechargeable or non-rechargeable), or an AC/DC or DC/DC converter that is taking power from external power source through a connector. Infra-Red (IR) LEDs and sensors 102d can be used for proximity detection or communication over IR.

Non-limiting examples of the applications, processes of configuring switches 104 for external device control, and the user interface for defining such configurations will be described. In addition, applications of other circuitry, such as the real time clock 116, memory 118, etc. will be described.

As previously stated, the wireless control device 100 can have one or multiple switches 104 (such as, but not limited to push pull switch, toggle switch, push button switch, rotary switch, resistive/capacitive switch, etc.). These switches 104 can be assigned an action for various permutations and combinations of turning ON/OFF or different positions. Actions can be turning ON light(s) at particular color/brightness level, connecting to phone or other wireless device, reading data from internal or external sensors, or sending commands to internal or external devices, etc.

An algorithm for configuring switches 104 using a software application may include the steps of:

1. Open the software application;
2. Connect to wireless control device 100 through the application software;
3. Define the switching action (e.g., press/click or turn ON/OFF one or multiple switches 104 once or multiple times in a defined time and defined pattern, etc.).
4. Assign an action to such defined switching action (e.g., turn the light ON to a particular color, etc.).

Figure 2A:
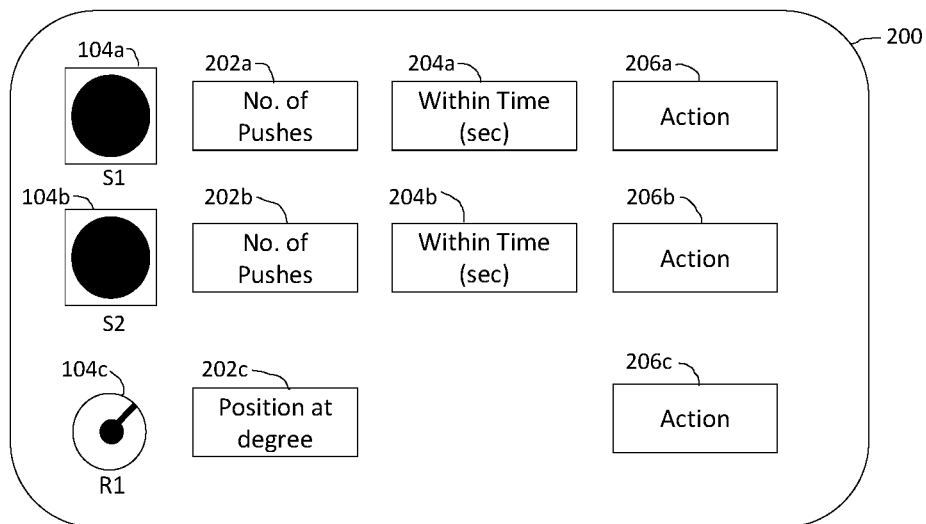
FIG. 2A is a diagram of a user interface screen for configuring one or more switches of the wireless control device in accordance with one embodiment of the present invention.
Figure 2B:
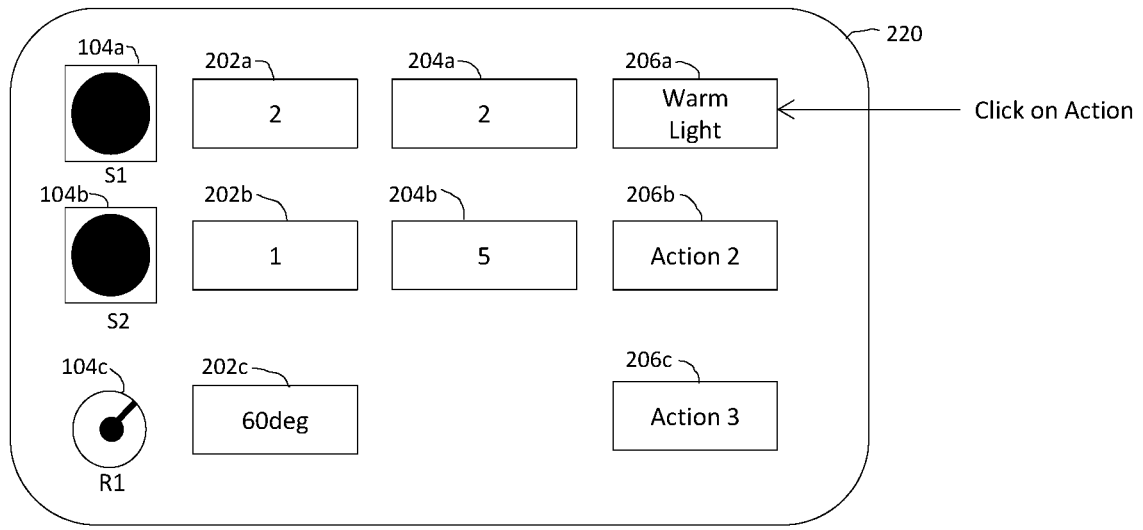
FIG. 2B is a diagram of a user interface screen showing a configuration example for the one or more switches in accordance with one embodiment of the present invention.
Figure 4:
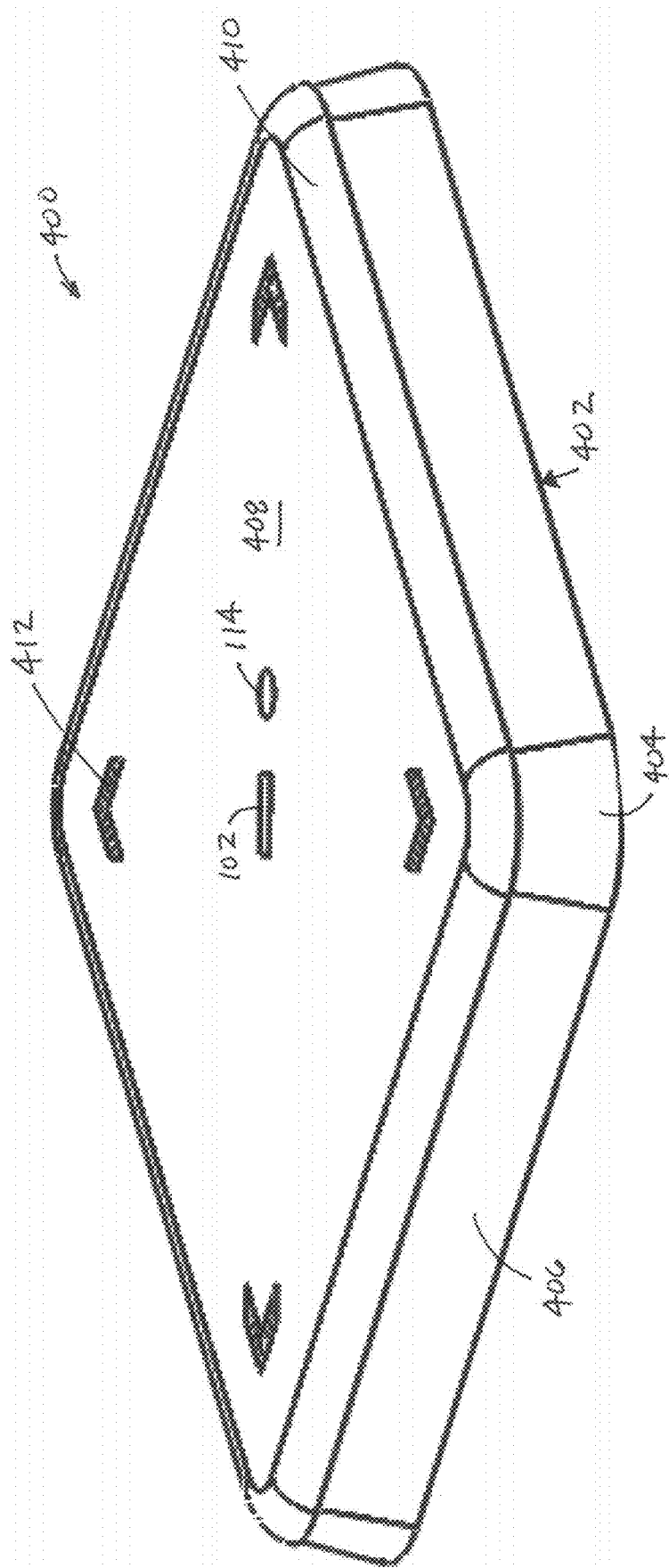
FIG. 4 is a perspective view of a wireless control device in accordance with one embodiment of the present invention.
Figure 5:
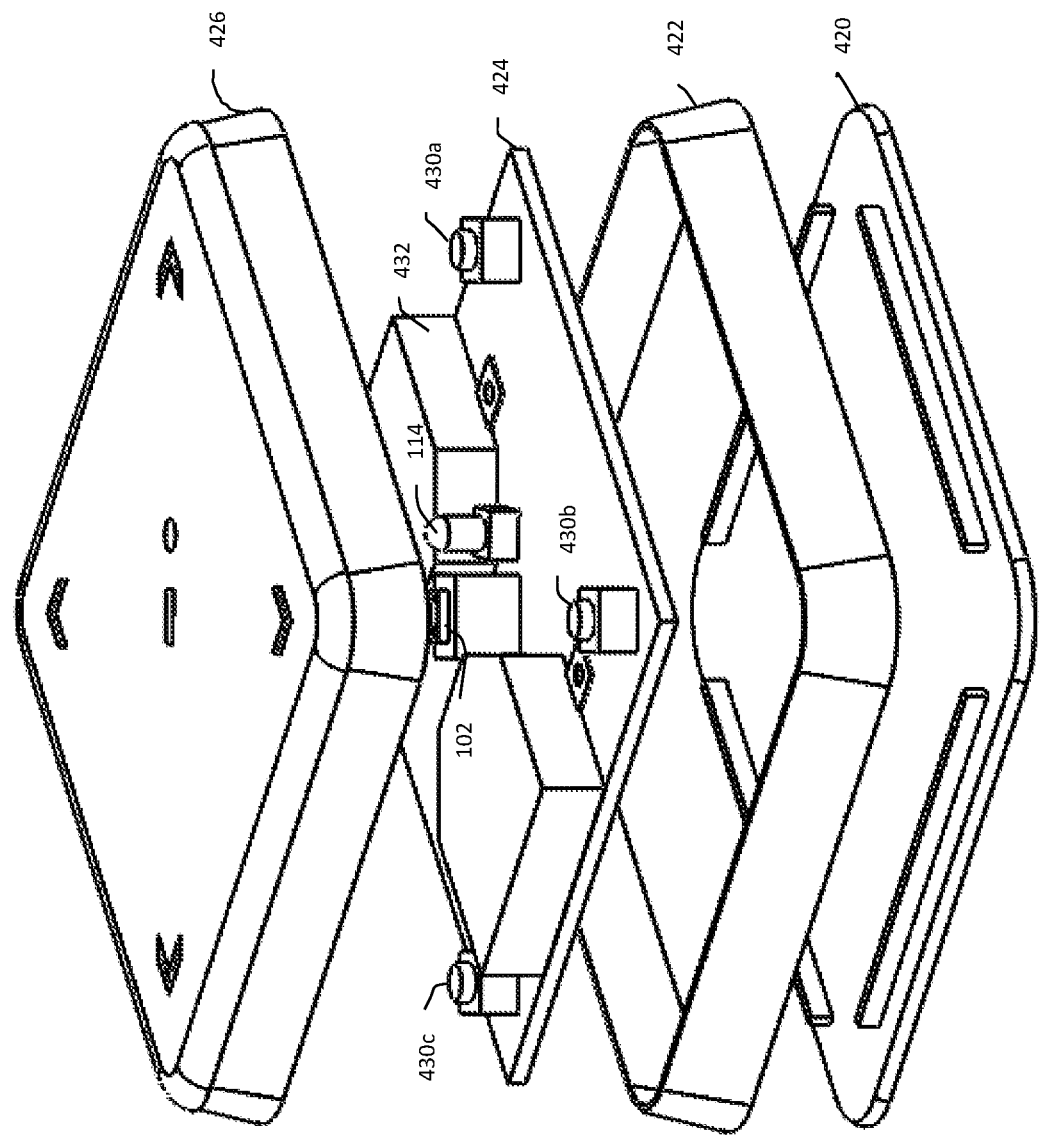
FIG. 5 is a exploded perspective view of the wireless control device shown in FIG. 4.
Figure 6:
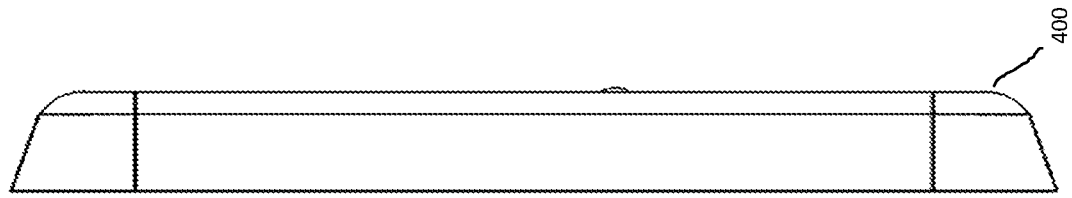
FIG. 6 is a side view of the wireless control device shown in FIG. 4.
Figure 7:
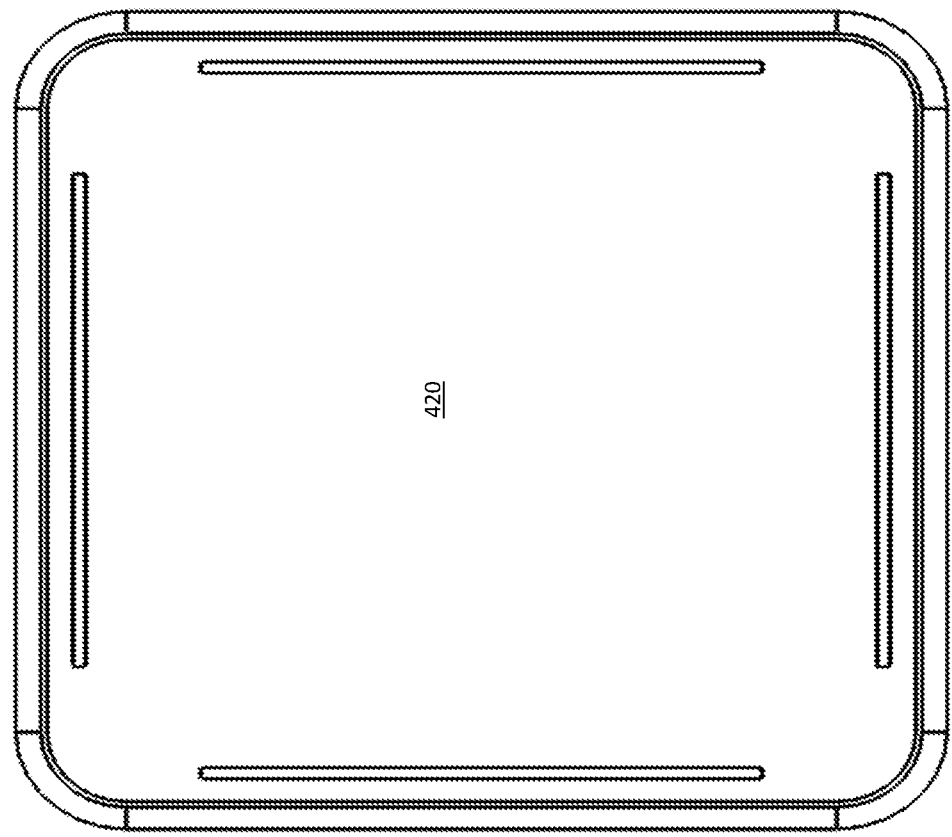
FIG. 7 is a top view of the base plate of the wireless control device shown in FIG. 4.
Figure 8:
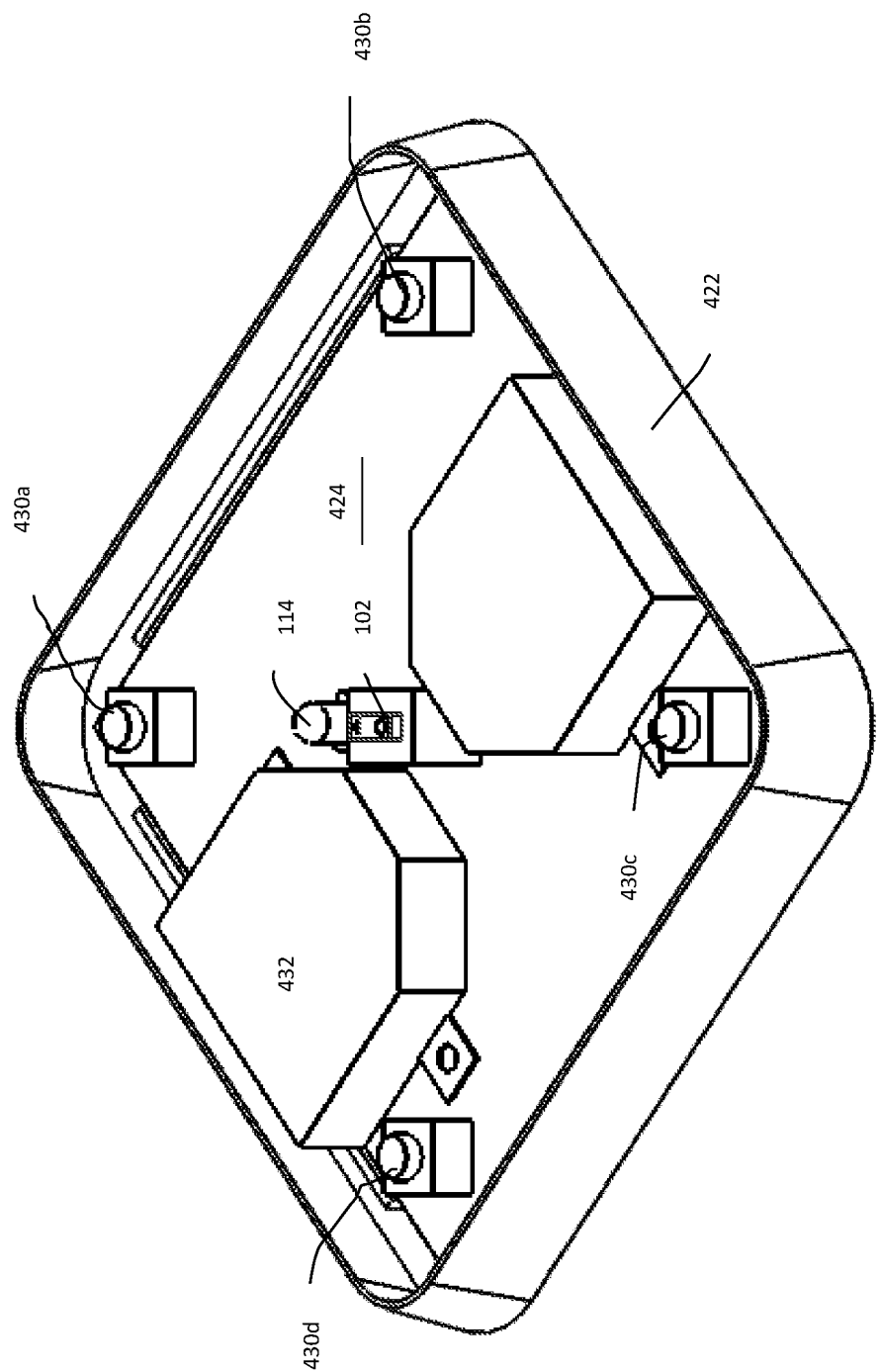
FIG. 8 is a perspective view of the wireless control device shown in FIG. 4 without a top cover.
Figure 9:
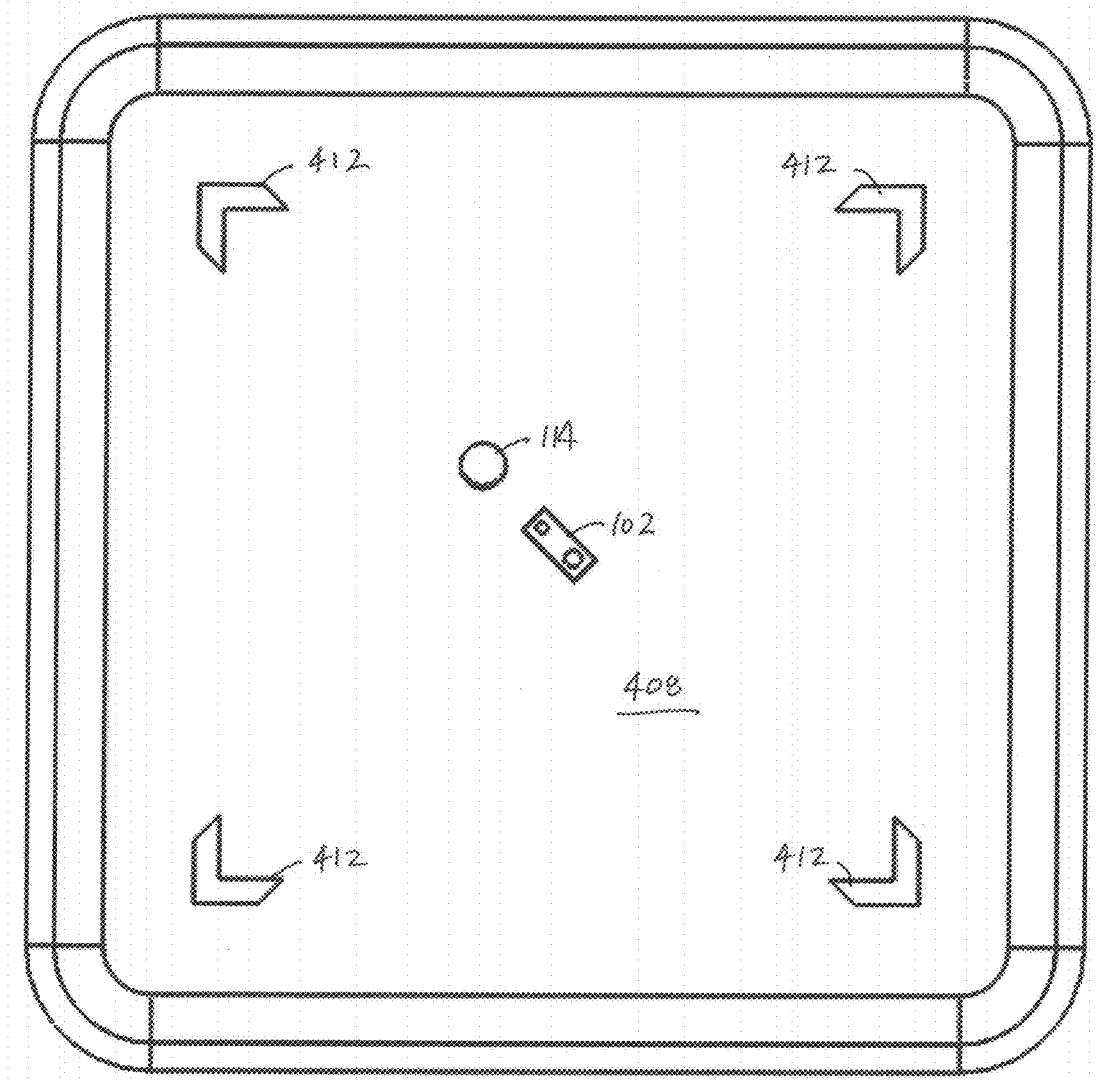
FIG. 9 is a top view of the wireless control device shown in FIG. 4.

Referring now to FIG. 2A, a diagram of a user interface screen 200 for configuring the one or more switches 104 in accordance with one embodiment of the present invention is shown. In this example, a graphical representation of each switch 104a (S1), 104b (S2), 104c (R1) along with one or more program parameters (e.g., number of pushes 202a within a specified period of time 204a for switch 104a; number of pushes 202b within a specified period of time 204b for switch 104b; position at degree 202c for switch 104c) and an action 206a, 206b, 206c for each switch 104a, 104b, 104c are displayed on the user interface screen 200. Note that more than two program parameters and more than one action can be provided. FIG. 2B is a diagram of the user interface screen 220 showing an example configuration of the one or more switches 104 in which switch 104a is programmed to turn on warm light (action 206a set to "Warm Light") whenever switch 104a is pushed twice (program parameter 202a set to "2") within two seconds (program parameter 204a set to "2"). Switch 104b is programmed to perform action two (action 206b set to "Action 2") whenever switch 104b is pushed once (program parameter 202b set to "1") within five seconds (program parameter 204b set to "5"). Switch 104c is programmed to perform action three (action 206c set to "Action 3") whenever switch 104c is turned to a position of sixty degrees (program parameter 202c set to "60 deg").

Proximity Sensor Applications in the Switch Device: The wireless control device 100 can have one or multiple proximity sensors 102c such as capacitive, electric field, magnetic field and IR based. Consider an IR based near field proximity sensor 102c that activates or changes the output signal whenever someone places his/her hand close to proximity sensor 102c. Based on this change in the signal provided as input to a processor 110, the processor 110 performs an action as defined internally, such as send a command to turn ON the light. When there are multiple such proximity sensors 102c on the device 100, and someone moves his/her hand over them in a particular direction (e.g., from down to up, etc.), each sensor produces variable outputs at different times based on position of the hand. These sensor outputs would form a pattern which can be monitored by the processor 110 and compared with defined and stored patterns. Once the compared patterns are matched, a particular action can be taken. This can be called as gesture recognition based on inputs from multiple IR sensors as well. For example, increasing the brightness when hand moves in down—up direction for a given number of times, or dimming the light when hand moves in up—down position for a given number of times in given time period.

Similarly, the wireless control device 100 can include an air quality or chemical sensor 102a. Air sensor can senses the purity of the air by sensing such things as oxygen levels, carbon dioxide or carbon monoxide levels, particulate levels, pollen levels, various particles, compositions, gases and chemicals in the air, etc.

Battery Energy Saving Mode by Time Multiplexing the Monitoring of the Sensors: The wireless control device 100 can have an energy saving mode that reduces power consumption and extends battery life by time multiplexing the monitoring of sensors 102. Consider a wireless control device 100 having various sensors such as proximity, ambient light and color sensors, air quality sensor, sound sensor (microphone), etc. The processor 110 within the wireless control device 100 will read data from sensors 102 and perform various actions based on the data. In addition, such a wireless control device 100 could work on battery, solar power, wireless energy receiver, AC or DC input. In many cases, power consumption for such a wireless control device 100 could be critical especially while running on battery or solar power. The power consumption becomes more critical when the number of sensors and electrical circuits are higher as each requires power to run. However, many times, the sensors 102 need not be active all the time or the processor 110 need not fetch data from sensors 102 all the time. The processor 110 can perform time division multiplexing or use pulsed sensing mechanism to activate the sensors 102 and fetch the data from them. Otherwise the sensor 102 can be in a sleep mode.

For example, a light sensor 102b, instead of providing ambient light data continuously, can provide the data for 10 mS at an interval of 1 second, or some time interval and for amount of time that is enough to provide required accuracy of the input data to the processor 110. This will save overall power consumption of up to 10 mS/1 S×100%=99% from the ambient light sensor 102b. In other words, 99% of the time, the sensor 102b will be in standby mode or sleep mode consuming extremely low power. In addition, sensors such as proximity sensors 102c can be activated in a similar way, but the active time can be increased when there is change in the input above threshold level. Consider a proximity sensor 102c with a single proximity sensor. It can be activated to sense the input for a short duration in every defined time interval as explained above for light sensor. However, the time when it should be active can be increased when there is a change in the input above given threshold. For example, consider that to ensure the reading accuracy sensor needs to be active for more than 100 mS, however, to sense the input change it needs only 10 mS. Therefore, the processor 110 can be programmed to activate the sensor for 10 mS every 1 S interval and read the input, and if the input crosses the defined threshold the processor 110 activates the sensor for more than 100 mS and reads the input for that amount of time and acts accordingly. This will help save the power by keeping the sensor on standby mode or sleep mode as much as required.

An example of an algorithm to save power with time multiplexing is as follows:

1. Activate the sensor or a particular electronic circuit for limited time and read the data;
2. Put the sensor or that particular electronic circuit to standby or sleep mode for a defined time; and
3. Repeat steps 1 and 2.

An example of an algorithm to save power with time multiplexing and active time change based on the input is as follows:

1. Activate the sensor or a particular electronic circuit for limited time and read the data;
2. Put sensor or that particular electronic circuit to a standby mode or sleep mode for a defined period of time;
3. Repeat step 1 and 2, and go to step 4 if the reading from step 1 is beyond defined threshold level;
4. Keep the sensor active for longer defined time duration and read the data (this time duration can be changed dynamically based on sensor input); and
5. Go to step 1.

Real Time Clock Based Sensing: Most of the time, various sensors need not be active for longer duration. For example, the light sensor 102b could be defined to be active only from 6 pm to 7 am based on sunset and sunrise times. Similarly, proximity sensor 102c can be defined to be active on weekdays from 5 pm to 8 am on weekdays and all day during the weekend based on a presence of a person in the room where wireless control device 100 is installed. This allows conserving the power used by wireless control device 100, which is important when it is running on limited power sources such as batteries, super capacitors, etc. The duration of sensor activeness could also be reduced in defined time period by increasing the interval duration (time) when sensor should become active for limited time period. An application on a controlling wireless device such as smartphone that is able to communicate with the sensor switch can help define such times when sensors need to be active. For example, interval time of 1 second at every 30 seconds as provided in the above examples could be 4 seconds or higher from 8am to 6 pm at every 30 seconds and 1 second from 6 pm to 8am at every 30 seconds saving additional power requirement. Such longer interval durations could be given specific names such as semi-sleep mode or low power or power saving mode. Various such power modes could be already part of the wireless device and wireless control device 100 system.

An example of an algorithm for real time clock based sensing is as follows:

1. Open the device with an application for controlling/communicating with the wireless control device 100 (device with an app would be able to communicate with wireless control device 100 wirelessly or through other electrical connections);
2. Configure the wireless control device 100 to low power modes or sleep modes for specific days and times—processor 110 will check the real time clock/timer inputs and act as per the configuration; and
3. Auto activation based on input of the wireless control device 100 during real time clock/timer based sensing program:

Auto Activation Based on Input of the Sensor During Real Time Clock/Timer Based Sensing Program: In the above real time clock/timer based program, it may happen that there are exceptions, such as user is available during the defined sleep mode or low power mode and thus need to override the real time clock based program with the normal program. In such situations, additional algorithms can be implemented where once sensors in the wireless control device 100 senses the change in the input in its phase or user turns the sleep mode or power saving mode OFF through an application on a controlling device, the normal or other program takes the control of the system. An example of an algorithm is as follows:

1. Monitor the sensor activity as defined in the defined mode such as sleep or power saving mode;
2. If any change in the input from the sensor observed during such mode, turn the other program or mode such as normal or active mode ON; and
3. Go back to sleep or power saving mode for the next defined iteration as per the real time clock/timer input Wireless Communication, such as Bluetooth, Based Activation of the Sensors: A user can also activate or bring the wireless control device 100 in the active mode from sleep mode through his/her wireless controlling device. For example, when the user opens the app (application software) on the controlling device, it tries to connect to the wireless control device 100 by sending commands. In such cases, as soon as wireless control device 100 gets the commands, it becomes active from sleep or other modes. Once the controlling device app is turned OFF and user has no intent to communicate with the wireless control device 100, the wireless control device 100 can go in the sleep mode or other mode after defined period of time. An example of an algorithm is as follows:

1. User opens the application software (app) on the controlling device;
2. Application initiates the communication with wireless control device 100 (assume that the processor in the wireless control device 100 continuously monitors for other controlling or companion devices even when its sensors are in sleep or power saving mode); and
3. When wireless control device 100 doesn't detect the controlling or companion device anymore, it could go back to sleep or power saving mode as per the defined program.

Button Based Activation of Sensors: The wireless control device 100 can go into a complete sleep mode (i.e., no sensors active at all or particular sensors are not active at all). Those sensors can be activated only when a button switch such as push button is pressed on the wireless control device 100. When pushed, the processor 110 gets a signal from the button switch and it then activates required sensors for defined time period. After this time period, the sensors go back to other modes as per the program. An example of an algorithm is as follows:

1. User presses the button switch and that is sensed by the processor 110 (sensors can be active for a defined time period once turned ON by commands from the processor);
2. Processor then activates the sensor(s) for a defined time period; and
3. Sensor(s) then go back to other modes as per the program(s) after the defined time period.

Proximity Sensor or Light Sensor Based Activation of the Sensor: One sensor can be activated based on inputs from other sensor(s) through processor. For example, when user waves hand around proximity sensor 102c so that there is a change in the proximity sensors output that is measured by processor 110, the processor 110 can based on such input activate other sensors such as ambient light sensor 102b or additional IR proximity sensor used for recognizing gestures for defined time period.

Configuring Sensor Switch with Permutations and Combinations: The wireless control device 100 can be configured through a software on a computing device such as smartphone, laptop, etc. The configuration software has options to configure at least one switch or sensor input with respect to time, number of ON/OFF commands (push switch, toggle switch or wave hand across a proximity sensor in particular direction at particular height, etc.) in a given time and interval of time for a specific trigger. The software can also configure the multiple switches in terms of a pattern when they are pressed with respect to each other in terms of time and no. of times, including they are pressed simultaneously for any time duration and at one or more interval of times to generate a trigger.

For example, configurations for various triggers could be defined as follows:

Turn ON/OFF one switch at a time;
Turn ON/OFF one switch every 1 second 4 times;
Keep hand on proximity sensor for a particular duration;
Wave hand on sensor in one direction n number of times;
Turn ON/OFF multiple switches simultaneously;
Turn ON/OFF multiple switches every 1 second 4 times;
Keep one or more switches ON/OFF for a duration of 5 seconds; or
Any possible permutations and combinations of above like configurations.

The controller or processor 110 monitors the inputs (ON/OFF conditions) from the switches 104 and determines the configuration as per the pattern. The processor 110 then generates a trigger with a specific command or data. The command can in turn be sent to another device such as light, fan, etc. for their control. Each configuration can be associated with different set of commands such as setting a light scene of multiple lighting devices, setting a AC temperature to a particular predefined value, turning the wireless plug ON or OFF, and many more.

Configure Based on Time with Real Time Clock: The configuration can also be associated with respect to a day and particular time in that day. For example, if the configuration is received by a processor at 7 am on weekday, the command sent by the processor 110 could be to turn lights ON to a cool white light. If the same configuration is received at 7 pm on weekend, the command sent could be to turn light ON to a warmer white light. The processor 110 is getting date and time update from the real time clock 116 and take actions based on the time when the configuration is received.

Now referring to FIG. 3A, a diagram of a user interface screen 300 for defining an action for the one or more switches 104 in accordance with one embodiment of the present invention is shown. The process of configuring the switches 104 can be easier on the user interface of the input device, such as computer or smartphone. As previously described in reference to FIGS. 2A-2B, the application software will have various parameters such as switch input (ON/OFF), time interval, number of times a particular switch input is provided, duration when the switch input is provided, variations in the input from the proximity sensor, number of times a particular type of input is provided through a sensor, etc. These options will be available on the user screen. In addition, the options for triggers or commands to devices such as turn light ON to particular color at a particular time and for a particular duration, change the A/C temperature setting, or generate a particular scene will be provided. The user can create its own command based on the permutations and combinations possibilities of devices to be controlled. This command and the configuration can be assigned to each other. Once assigned, the user can save this into the sensor switch device's processor memory or external memory accessible to the processor. The processor then monitors the inputs from sensors and switches for a configuration to trigger a command created by the user also saved in the memory. A user interface is shown to define such actions with various switch/sensor combinations in FIGS. 3A-3C.

As shown in FIGS. 3A-3C, the user can create his/her own command or action 206 based on permutations and combinations possibilities of devices to be controlled. This command or action 206 and the configuration can be assigned to each other. Once assigned, the user can save this into the memory 118 of the wireless control device 100 or external memory accessible to the processor 110. The processor 110 then monitors the inputs from sensors 102 and switches 104 for a configuration to trigger a command created by the user also saved in the memory 118. Each command or action 206 can be defined by selecting one or more devices 302, defining a start/end time for the action 304 and defining a task for the selected device using the user interface screen 300. For example, FIG. 3B illustrates a user interface screen 320 in which a "Warm Light" action 206a is defined by selecting the living room lights 302, having a start/end time of Monday to Friday 6 pm to 11 pm 304, and a task of turning the living room lights to a warm light scene 306. In another example, FIG. 3C illustrates a user interface screen 340 in which an "Action 3 (Brightness Control)" action 206c is defined by selecting the living room lights 302, having a start/end time of always 304, and a task of adjusting the brightness based on the rotary switch position (359 degrees for full and 0 degrees for zero) 306. Programmable scenes and other lighting effects are described in U.S. Pat. No. 9,113,528 and U.S. provisional patent application 62/189, 637, both of which are hereby incorporated by reference in their entirety.

Configuring the Light Adjustment through a Light Sensor and Real Time Clock: A user can also create a rule with respect to the light sensor that measures ambient light intensity and/or ambient light color and real time clock. The user can create this rule in an application software with user interface on the computing device such as computer or smartphone. The interface will have options to create a trigger to change the light output from a lighting device in the vicinity or adjust the electrically controllable shade (such as on windows) based on the ambient light measured at particular time of the day. The user can select the number/amount in terms of lumens or other light measurement unit at which the trigger should get generated and the time interval for particular days using RTC when trigger should be delivered as a command to a lighting device or controllable shade device.

Updating the Time in the Connected Devices through a Sensor Switch; The sensor switch can have RTC which retains the real time and day information with the help of a power from the battery. This sensor switch can update the day/time info in real time of the other connected devices which don't have battery to retain the time information or synchronise their clocks. The sensor switch can monitor the day and time information of the devices directly or through a mesh network and update it in case of discrepancy.

The clock (Real Time Clock) could be a part of the smart devices as well as controlling devices. In addition, the various sensors such as GPS location, proximity, occupancy, sound (mic), etc. are also part of smart devices and controlling devices.

For example, a wireless control device includes a power source, one or more sensors, one or more switches, a real time clock, a wireless transceiver circuit, an antenna connected to the wireless transceiver circuit, and a processor communicably coupled to the power source, the one or more sensors, the one or more switches, the real time clock and the wireless transceiver circuit. The processor receives a data from the one or more sensors or the one or more switches, determines a pre-defined action associated with the data that identifies one or more external devices and one or more tasks, and transmits one or more control signals via the wireless transceiver circuit and the antenna that instruct the identified external device(s) to perform the identified task(s) The wireless control device as recited in claim 1, wherein the one or more sensors comprise an air quality sensor, an ambient light sensor, a temperature sensor, a humidity sensor, a proximity sensor, a motion sensor, a sound sensor or a combination thereof.

The wireless device may also include a memory and one or more LED indicators communicably coupled to the processor, an external control device communicably coupled to the processor of the wireless control device via the wireless transceiver circuit and antenna wherein the external control device provides one or more user interface screens that create and store the pre-defined actions, a housing in which the power source, the one or more sensors, the one or more switches, the wireless transceiver circuit, the antenna and the processor are disposed. The housing can be any shape, such as substantially square having rounded corners, sloped sides and a substantially flat top having rounded sides. The processor may further execute a time division multiplexing or pulsed sense mechanism to activate and deactivate the one or more sensors. The one or more switches may include a push pull switch, a toggle switch, a push button switch, a rotary switch, a resistive/capacitive switch, or a combination thereof. In one example, the one or more switches comprise four switches, each switch is disposed below the substantially flat top proximate to each rounded corner, and each switch is activated by touching or depressing an area of the substantially flat top proximate to the switch. In another example, the housing includes a base plate, an outer ring attached to the base plate, an electronic board disposed within the outer ring and attached to the base plate, a top cover disposed over the outer ring and attached to the base plate, and wherein the power source, the one or more sensors, the one or more switches, the wireless transceiver circuit, the antenna and the processor are attached to the electronic board.

New controlling applications of the clock such as Real Time Clock in various smart devices such as smart lighting product, smart thermostat, etc. and the controlling devices such as smartphone, tablets, computers, remotes, etc. will be presented below after the discussion of FIGS. 4-9.

Now referring to FIGS. 4-9, various views of a wireless control device 400 in accordance with one embodiment of the present invention are shown. The control device 400 has a substantially square-shaped footprint 402 with rounded corners 404, sloped sides 406 and a top 408 with rounded edges 410. The top 408 may include one or more sensors 102, indicator light 114 and switch indicators 412. The control device 400 includes a base plate 420, an outer ring 422 attached to the base plate 420, and electronic board 424 disposed within the outer ring 422 and attached to the base plate 420, and a top cover 426 that mates with the outer ring 422. The electronic board 424 can include any or all of the components described in reference to FIG. 1. For example, this embodiment includes four switches 430a, 430b, 430c, 430d mounted proximate to the corners 404 of the device 400, one or more sensors 102 and an indicator light 114 proximate to a center of the top cover 426, and one or more batteries 432.

The base plate 420 is where the electronic board 424 rests. The top cover 426 can be aligned such that it meets the base plate 420 at the edges giving smooth finish on all sides, or the top cover 426 can accommodate the base plate 420. The base plate 420 and the top cover 426 can be assembled by glue, snap fit structure, screws or any other desired fastener.

The outer ring 422 can be a rigid part that is plastic or metal. The outer ring 422 provides better look and rigidity to the wireless control device 400.

The electronic board 424 has all the electronics including a battery 432 with a battery holder, sensor(s) 102, switches 430, power converters, real time clock circuitry, LED 114 with the light pipe assembly, reset switch, controller with wireless circuit and antenna. Typically, the sensor is tiny so it needs to be elevated so that the front side of the sensor (sensing part) is open to the environment to receive the signal. It is possible by assembling a sensor 102 on top of a small PCB and elevating the PCB by a connector between actual electronic board PCB and the sensor PCB. The small PCB along with the connector will provide the required electrical connections between the sensor 102 and the processor circuitry. Also, the LED 114 on the PCB could be very small. In that case, a light pipe can be put on top of it so that the light is transmitted out of the top cover hole.

The top cover 426 can be plastic, silicone, elastomer or other material with holes open or with transparent cover on them to allow sensor input and LED light output. The top cover 426 covers the assembly including the electronic board 424 from the top and the sides. The top cover 426 is such that when pressed at the top of the switches 430, the switches 430 (e.g., push button and reset switches, etc.) on the electronic board 424 are pressed. The top cover 426 can also have side doors to insert and take out the batteries 432.

Figure 10:
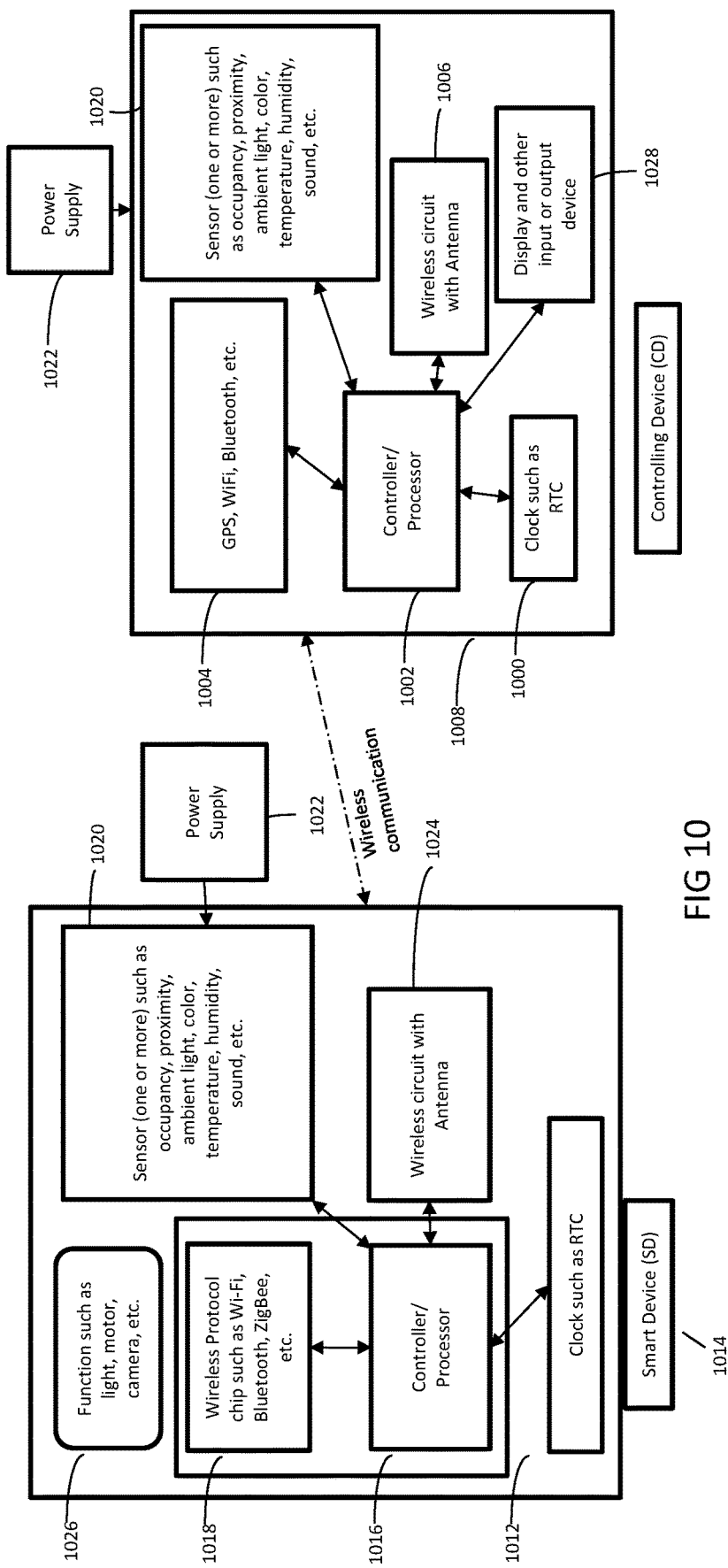
FIG. 10 is a block diagram showing two types of devices in accordance with one embodiment of the present invention.

Referring now to FIG. 10, there are two types of devices. First one, a smart device 1014 which consists of at least one of wireless protocol such as Wi-Fi, Bluetooth, ZigBee, RF, etc., circuit 1018, controller/processor 1016, wireless circuit with antenna 1024, Clock such as RTC (Real Time Clock) circuit 1012, and a sensor (one or multiple) 1020 such as occupancy, proximity, ambient light, ambient light color, temperature, humidity, sound, etc. sensor, and additional functional circuitry such as required for LED lighting, running a fan, running a motor, camera device, thermostat, etc. 1026, power supply 1020 such as battery, solar device, or any other AC or DC voltage and current providing circuitry. Please note that wireless circuit 1018 and controller/processor can be one circuit also known as On-System-Chip solution. Similarly, second type is controlling device 1008 that interacts and controls the smart device. The controlling device may consist of similar components as on smart device. It can also consist of GPS technology as part of wireless protocols 1004. Both, smart device and controlling device may consist of display or other input/output 1028 circuits as well. The examples of controlling device are smart phones, tablets, computers, remote controls, etc. The controlling device can interact, configure and control the smart device with a required software application running onto it. Applications of the clock in smart or controlling device will now be explained.

Figure 11:
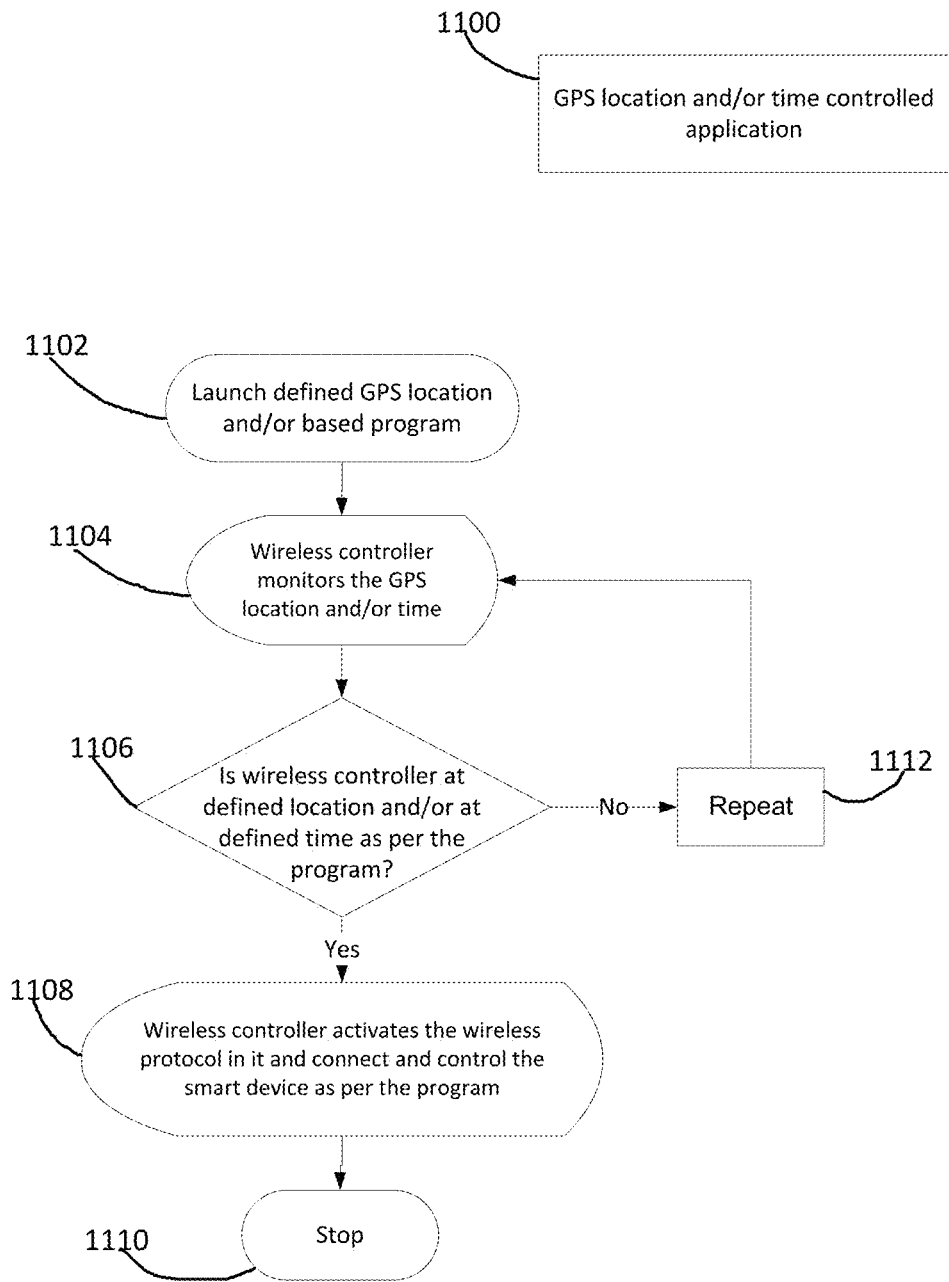
FIG. 11 is a flow chart of a GPS location and/or time controlled process in accordance with one embodiment of the present invention.

Referring now to FIG. 11, a flow chart of a GPS location and/or time controlled process in accordance with one embodiment of the present invention is shown. In various systems, the smart devices using Bluetooth or other wireless signals, are controlled through wireless controllers with GPS protocol such as Smartphones. There is a need to initiate a wireless control to control the smart device(s) based on the wireless controller's location to utilize the available power/energy (such as battery) in the wireless controllers effectively and to activate the smart devices having specific functionalities as a function of the controlling device's location. For example, wireless controller would initiate the application and the Bluetooth protocol to turn the smart lights with Bluetooth protocol ON when it is at a particular location or within a defined periphery or a wireless range of the smart lights. Or a smart security gate controller by Bluetooth opens when wireless controller reaches at a particular location or within a defined periphery or a wireless range of the smart gate. This functionality can also be a function of time such that the event triggers only when wireless controller is at particular location at certain times. The algorithm would be:

1. Required program(s), which are function of time and/or location to trigger an event, i.e., smart device 1014 acting as per the program are stored in wireless controlling device 1008 and smart device applications.

2. When wireless controlling device 1008 is at a defined location and/or defined time as per the program, it activates the wireless protocol in the wireless controller that makes it connect and control the smart device as per the required program.

More specifically, the defined GPS location and/or based program is launched in block 1102. The wireless controller monitors the GPS location and/or time in block 1104. If the wireless controller is at a defined location and/or at a defined time as per the program, as determined in decision block 1106, the wireless controller activates the wireless protocol in it and connects and controls the smart device as per the program in block 1108, and the process stops in block 1110. If, however, the wireless controller is not at a defined location and not at a defined time as per the program, as determined in decision block 1106, the process repeats in block 1112 by looping back to monitor the GPS location and/or time in block 1104.

Figure 12:
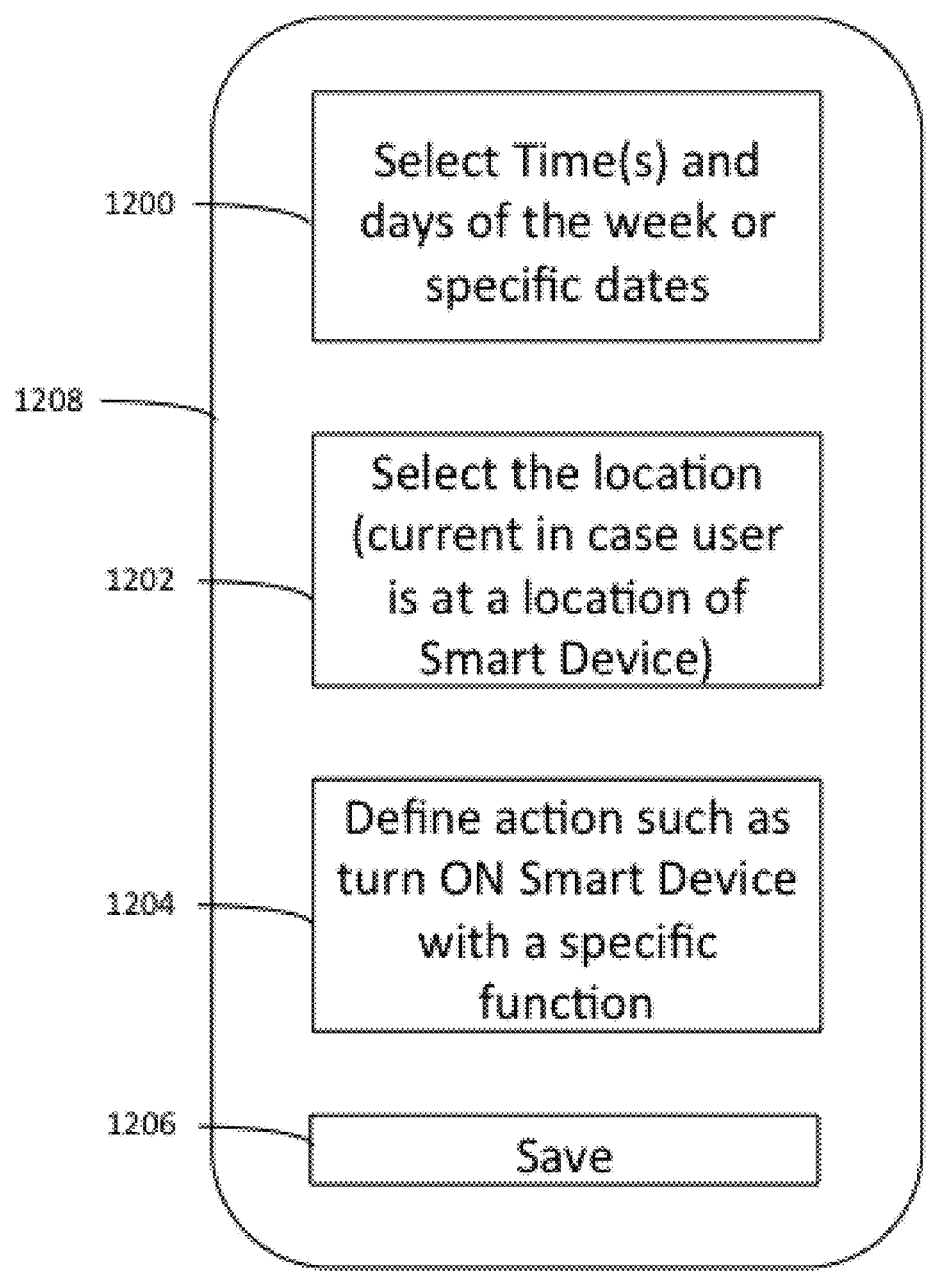
FIG. 12 is a diagram of a user interface screen with options to select the time, date or days of the week and select location or chose current location in case the user with the controlling device is at the location of the smart device(s) in accordance with one embodiment of the present invention.

The user interface on the software application running on a controlling device can be used to define such clock and GPS (location based service) based algorithm. Referring the FIG. 12, the user interface 1208 will have on a single screen or multiple screens, options to select the time, date or days of the week 1200 and select location or chose current location in case the user with the controlling device 1202 is at the location of the smart device(s). The user interface will also have options so that the user can define the action the smart device should take 1204 such as turn ON with a specific state. This way, the location and time based triggers can be defined saved using save button on the user interface 1206 and executed. The clock used in this application can be of either smart device 1014 or controlling device 1008.

Figure 13:
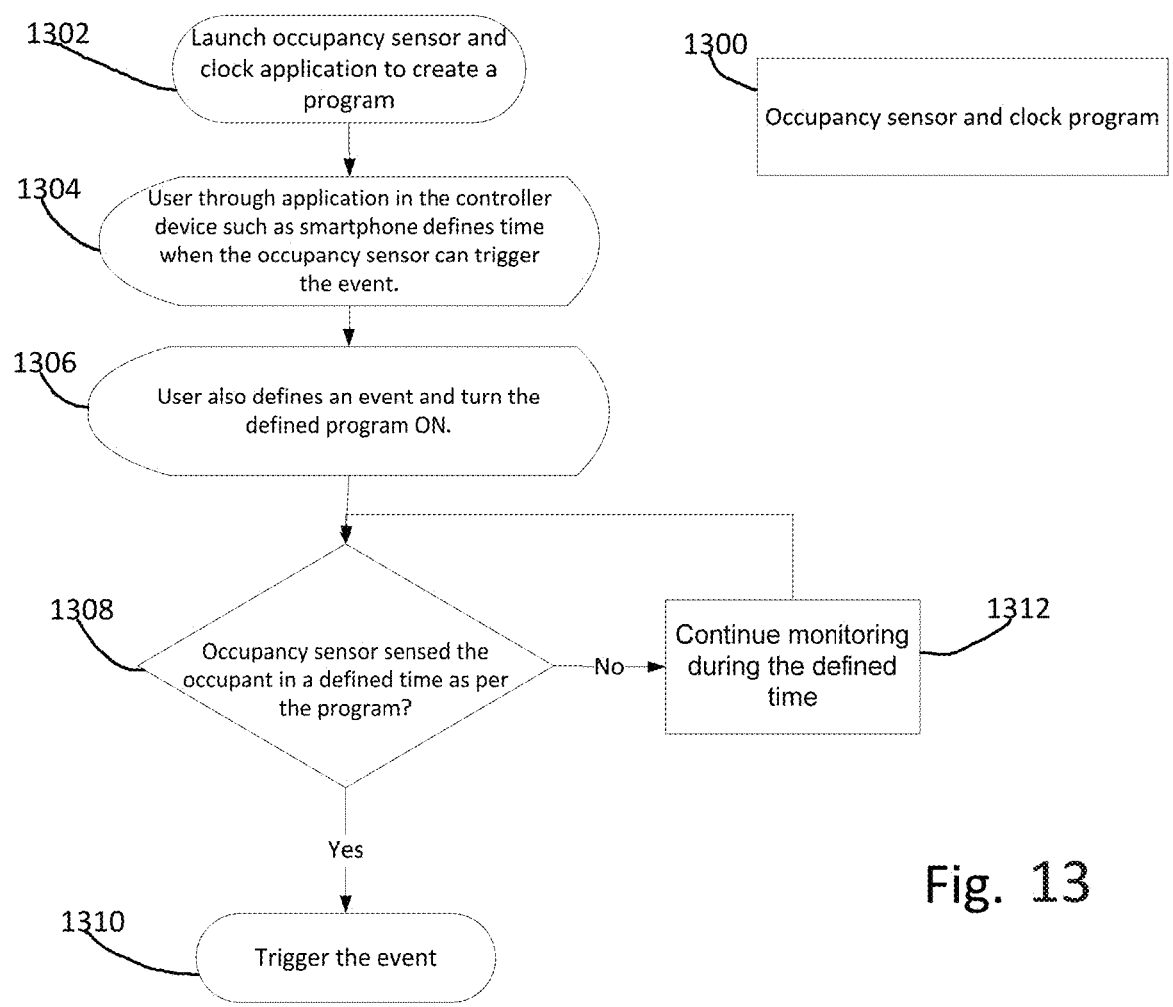
FIG. 13 is a flow chart of a GPS location and/or time controlled process in accordance with one embodiment of the present invention.

Now referring to FIG. 13, a flow chart of an occupancy sensor 1020 and clock 1012 process 1300 in accordance with one embodiment of the present invention is shown. Occupancy sensor 1020 senses the occupant in the vicinity and can trigger the event such as turn the light ON or open the gate. It can also be a function of time with the use of RTC 1012. The occupancy sensor and clock application is launched to create a program in block 1302. The user through application in the controller device such as smartphone defines time when the occupancy sensor can trigger the event in block 1304. The user also defines an event such as turn a particular smart lighting device(s) in the network ON at a particular color and brightness in block 1306. When the occupancy sensor senses the occupant in a defined time, as determined in decision block 1308, it triggers the defined event in the smartlight in block 1310. If, however, the occupancy sensor does not sense the occupant in a defined time, as determined in decision block 1308, monitoring is continued during the defined time in block 1312 and the process loops back to decision block 1308.

In addition, a light and/or color sensor 1020 can sense the light in the vicinity and can trigger the function to control the light output of particular smart device such a smart lighting device in terms of color and brightness as a function of time. The clock of one smart device can be used to trigger the function of other smart device(s) in the network as well.

1. User through application in the controller device such as smartphone defines time when the light and/or color sensor can trigger the event.

2. User also defines an event such as change the light output in terms of brightness and/or color of particular smart lighting device(s) in the network.

3. When light and/or color sensor senses the required light change in the vicinity to trigger an event in a defined time, it triggers the defined event in the smart lighting device(s).

Figure 14:
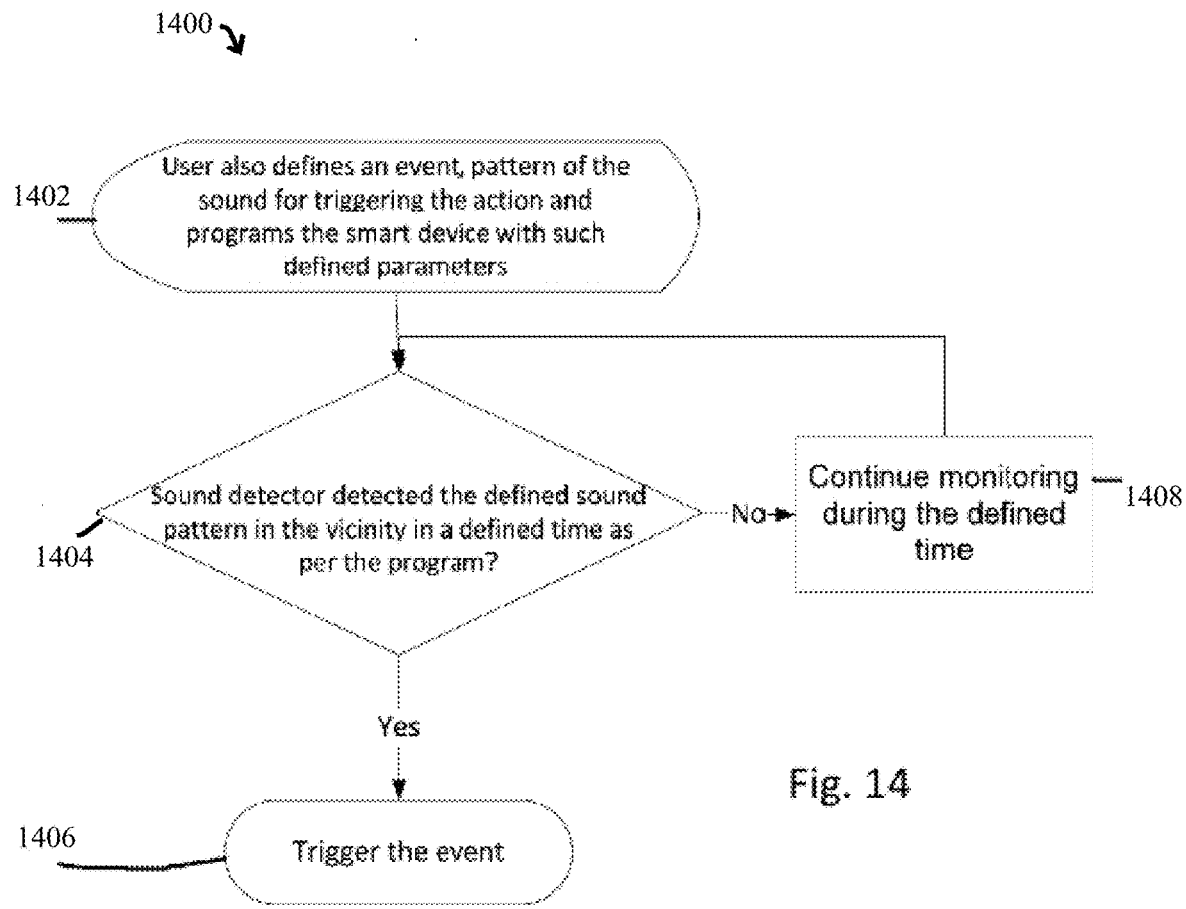
FIG. 14 is a flow chart of an occupancy sensor and clock process in accordance with one embodiment of the present invention.

Similarly, a sound sensor (detector) such as a microphone and related circuitry 1020 in the smart device 1014 can be used in association with the clock to generate triggers for specific function of the Smart Device 1014. The algorithm 1400 is shown in FIG. 14. The user defines an event, a pattern of sounds for triggering the action and programs the smart device with such desired programs in block 1402. For example, the sound generated by 4 claps within 4 seconds at particular day(s) within specific time period, such as from 6 pm to 9 pm Monday through Wednesday. When such a pattern is detected by controller/processor 1016 through a sound sensor 1020, as determined in decision block 1404, a specific trigger is generated for smart device for a specific action in block 1406. For example, turning the smart lighting device ON at particular brightness and color or turn off smart thermostat. The trigger can be generated and passed on by controller/processor 1016 through wireless protocol chip 1018 in turn, through antenna 1024 of a smart device to another smart device(s) for specific action(s). If, however, the pattern is not detected by controller/processor 1016 through a sound sensor 1020, as determined in decision block 1404, monitoring is continued during the defined time in block 1408 and the process loops back to decision block 1404.

Figure 15:
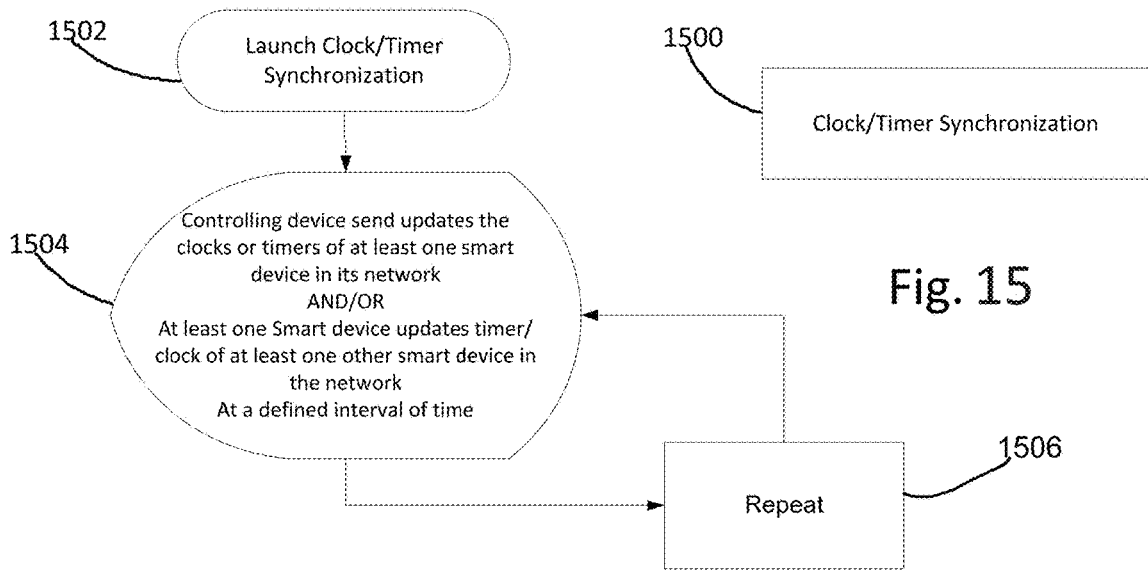
FIG. 15 is a flow chart of a clock/timer synchronization process in accordance with one embodiment of the present invention.

Now referring to FIG. 15, a flow chart of a clock/timer synchronization process 1500 in accordance with one embodiment of the present invention is shown. Controlling device 1008, such as smartphone, sends various programs to smart device 1014 with such as smart lighting device, smart thermostat, smart lock, etc. that can be stored inside the smart device 1014 and turned ON at a very specific time. Various programs require smart device(s) 1014 to be turned ON or run a specific application at the same time or in a defined time interval and time synchronization is required in such cases. The clock/timer synchronization is launched in block 1502. The controlling device sends updates to the clocks or timer of at least on smart device in its network and/or at least one smart device updates the timer/clock of at least one other smart device in the network at a defined interval of time in block 1504. The process is repeated periodically as indicated by block 1506.

For example, consider a lighting and temperature program of simulated sunrise. A user will send such program with defined specific time such as 7 am every weekday to each smart lighting device bulb to turn ON at specific color and brightness and thermostat to control temperature to a specific level. Similarly, a program with blue ocean wave pattern through smart lighting device, where each smart lighting device produces certain type of light output at defined specific interval. Once programmed the smart lighting device and thermostat will monitor the clock 1012 that could be real time clock powered by battery or super capacitor or input mains, or a processor timer defined for various programs inside the bulb. Once the specific defined time is reached the program will get triggered to turn ON. In such cases, issues could arise if the clocks or timers inside each smart device are not synchronized due to various reasons such as drift in the clock or interruptions in the power to the clock, i.e. not showing the same time. Clocks can be synchronized in following two ways:

1. Controlling device 1008 updates the clock or timer of each smart device 1014 regularly.
2. Smart devices update each other's clocks or timers for specific programs or regularly. In this case, one smart device will be chosen to update all smart devices to synchronize with its own clock or timer. Such device can be chosen based on its ID differentiation, such as highest MAC ID or it could be user defined or it could be the one with the latest or highest date/time of all smart devices in the network.

For example, one or more external devices are controlled by providing a wireless control device comprising a housing, a power source disposed in the housing, one or more sensors disposed on or within the housing, one or more switches disposed on or within the housing, a wireless transceiver circuit disposed within the housing, an antenna disposed on or within the housing and connected to the wireless transceiver circuit, a processor disposed within the housing and communicably coupled to the power source, the one or more sensors, the one or more switches, and the wireless transceiver circuit. A data is received from the one or more sensors or the one or more switches. A pre-defined action associated with the data is determined that identifies the one or more external devices and one or more tasks using the processor. One or more control signals via the wireless transceiver circuit and the antenna are transmitted that instruct the identified external device(s) to perform the identified task(s). Additional steps may include defining the one or more switches and the pre-defined action associated with the data that identifies the one or more external devices and one or more tasks using the processor, activating the one or more sensors whenever a command is received via the wireless transceiver circuit and the antenna, activating the one or more sensors based an input received from the one or more switches, and/or configuring the one or more switches to recognize one or more patterns, activating the one or more sensors based on a real time clock or clock/timer based program.

The processor may execute a time division multiplexing or pulsed sense mechanism to activate and deactivate the one or more sensors. In one example, a power consumption of the device can be reduced by time multiplexing an activation and deactivation of the one or more sensors. The time multiplexing the activation and deactivation of the one or more sensors may include (a) activating the one or more sensors for a first time period and reading the data from the one or more sensors, (b) deactivating the one or more sensors for a second time period, and repeating steps (a) and (b). Note that the first timer period, the second time period or both time periods can be adjusted.

The one or more sensors may include at least a first sensor and a second sensor, and in which the second sensors are activated based an input received from the first sensor. The one or more switches can be configured musing a user interface communicably coupled to the processor, wherein the user interface is displayed on the device or on anther device communicably coupled to the device. The user interface may display a graphical representation of the one or more switches along with one or more program parameters and the pre-defined action using the user interface. Similarly, setting the pre-defined action associated with the data, and identifying the one or more external devices and the one or more tasks can be performed using a user interface communicably coupled to the processor. The user interface can display the pre-defined action, the identified external devices and the one or more tasks. In one example, the data may include a time, a time period, a day of a week, a specific date and/or a sensor data. An external control device communicably coupled to the processor of the wireless control device via the wireless transceiver circuit and antenna can be used to provide one or more user interface screens that create and store the pre-defined actions.

The one or more external devices may include a lighting device, and the process may further measure an ambient light intensity and/or color using the one or more sensors, and the identified task(s) includes changing a light intensity and/or color from the lighting device. A date and/or time update can be sent to the one or more external devices via the wireless transceiver circuit and the antenna. The date and/or time update may synchronize a clock in the one or more external devices with the wireless control device.

The one or more sensors may include a clock and at least one of a GPS sensor, an occupancy sensor, a light and/or color sensor or a sound sensor, and the pre-defined action may include a computer program that causes the processor to send one or more commands to the one or more external devices via the wireless transceiver circuit and the antenna. Other sensors may include an air quality sensor, an ambient light sensor, a temperature sensor, a humidity sensor, a proximity sensor, a motion sensor, or a combination thereof.

Figure 16:
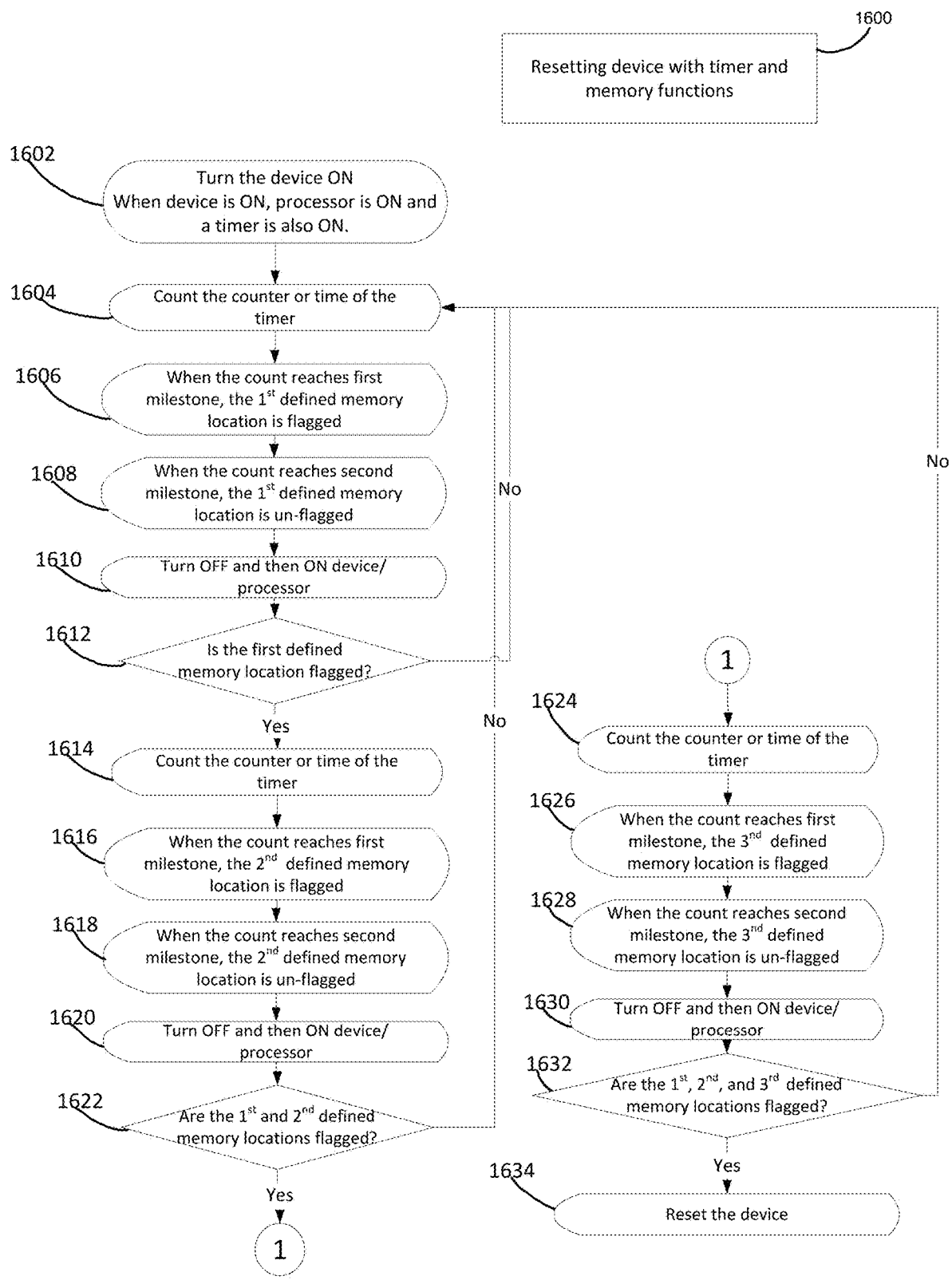
FIG. 16 is a flow chart of a process to reset the hardware or programming using the processor timer in accordance with one embodiment of the present invention.

Referring now to FIG. 16, a flow chart of a process 1600 to reset the hardware or programming using the processor timer in accordance with one embodiment of the present invention is shown. Note that the device can be a wired device, wireless device or standalone device. For any embedded device with controller or processor, the reset function is must. Most of the times, the device uses external reset switch. In addition, when the devices is reset is comes to a state of one defined program, which limits how the number of states the device can be turned ON. In any case, the Reset switch is also additional hardware cost in the device. The system can be reset or initiated for various programs through turn ON/OFF sequences using the timer and memory functions of the controller or processor. For that consider that any of the below steps can be used.

1. Processor can be defined such that whenever the processor is turned a timer starts and processor counts the clock cycles or time for which the timer is ON.
2. Processor can be defined such that when the count or time reaches a first milestone (such as 1000 counts or 1 second), it flags (makes 0 to 1 change in) a first defined location of the memory.

3. Processor can be defined such that when the count or time reaches a nth milestone, (such as n×1000 counts or n×1 second), it flags nth defined location of the memory.

4. Processor can be defined such that when the count or time reaches a particular milestone, (such as m×1000 counts or m×1 second), it removes the flags from (makes 1 to 0 change in) one or more defined location of the memory.

5. Processor can be defined such that when any of the above steps 2, 3, or 4 happens twice, it flags another specific memory location.

6. Processor can be defined such that when any of the above steps 2, 3, or 4 happens multiple times, it flags another different specific memory location.

7. The processor is programmed such that it initiates a specific action or event depending on flags in a memory location.

An example of reset function can be a program defined such that when the device is turned ON and OFF thrice in a row, each time within 1 second and 2 seconds, the device resets itself to default settings. The algorithm "Resetting the device through timer and memory function" 1600 begins in block 1602 when the device is turned ON (when the device is ON, the processor is ON and a timer is also ON). The counter or time of the timer is counted in block 1604. When the count reaches the first milestone, the first defined memory location is flagged in block 1606. When the count reaches the second milestone, the first defined memory location is unflagged in block 1608. The device/processor is turned OFF and then ON in block 1610. If the first defined memory location is not flagged, as determined in decision block 1612, the process loops back to block 1604 where the counter or time of the timer is counted. If, however, the first defined memory location is flagged, as determined in decision block 1612, the counter or time of the timer is counted in block 1614. When the count reaches the first milestone, the second defined memory location is flagged in block 1616. When the count reaches the second milestone, the second defined memory location is unflagged in block 1618. The device/processor is turned OFF and then ON in block 1620. If the first defined memory location is not flagged or the second defined memory location is not flagged, as determined in decision block 1622, the process loops back to block 1604 where the counter or time of the timer is counted. If, however, the first defined memory location is flagged and the second defined memory location is flagged, as determined in decision block 1622, the counter or time of the timer is counted in block 1624. When the count reaches the first milestone, the third defined memory location is flagged in block 1626. When the count reaches the second milestone, the third defined memory location is unflagged in block 1628. The device/processor is turned OFF and then ON in block 1630. If the first defined memory location is not flagged or the second defined memory location is not flagged or the third defined memory location is not flagged, as determined in decision block 1632, the process loops back to block 1604 where the counter or time of the timer is counted. If, however, the first defined memory location is flagged and the second defined memory location is flagged and the third defined memory location is flagged, as determined in decision block 1632, the device is reset in block 1634.

For example, the process resets a device by providing the device having a counter or timer, a memory and a processor communicably coupled to the counter or timer and the memory, (a) determining a count based on the counter or a time based on the timer, (b) flagging a first defined memory location when the count or time reaches a first milestone, (c) un-flagging the first defined memory location when the count or time reaches a second milestone, (d) turning the device OFF and then ON again, (e) repeating steps (a) through (d) when the first defined memory location is not flagged, (f) determining the count based on the counter or the time based on the timer, (g) flagging a second defined memory location when the count or time reaches the first milestone, (h) un-flagging the second defined memory location when the count or time reaches the second milestone, (i) turning the device OFF and then ON again, (j) repeating steps (a) through (i) when the first defined memory location is not flagged or the second defined memory location is not flagged, (k) determining the count based on the counter or the time based on the timer, (l) flagging a third defined memory location when the count or time reaches the first milestone, (m) un-flagging the third defined memory location when the count or time reaches the second milestone, (n) turning the device OFF and then ON again, (o) repeating steps (a) through (n) when the first defined memory location is not flagged or the second defined memory location is not flagged or the third defined memory location is not flagged, and (p) resetting the device.

Figure 17:
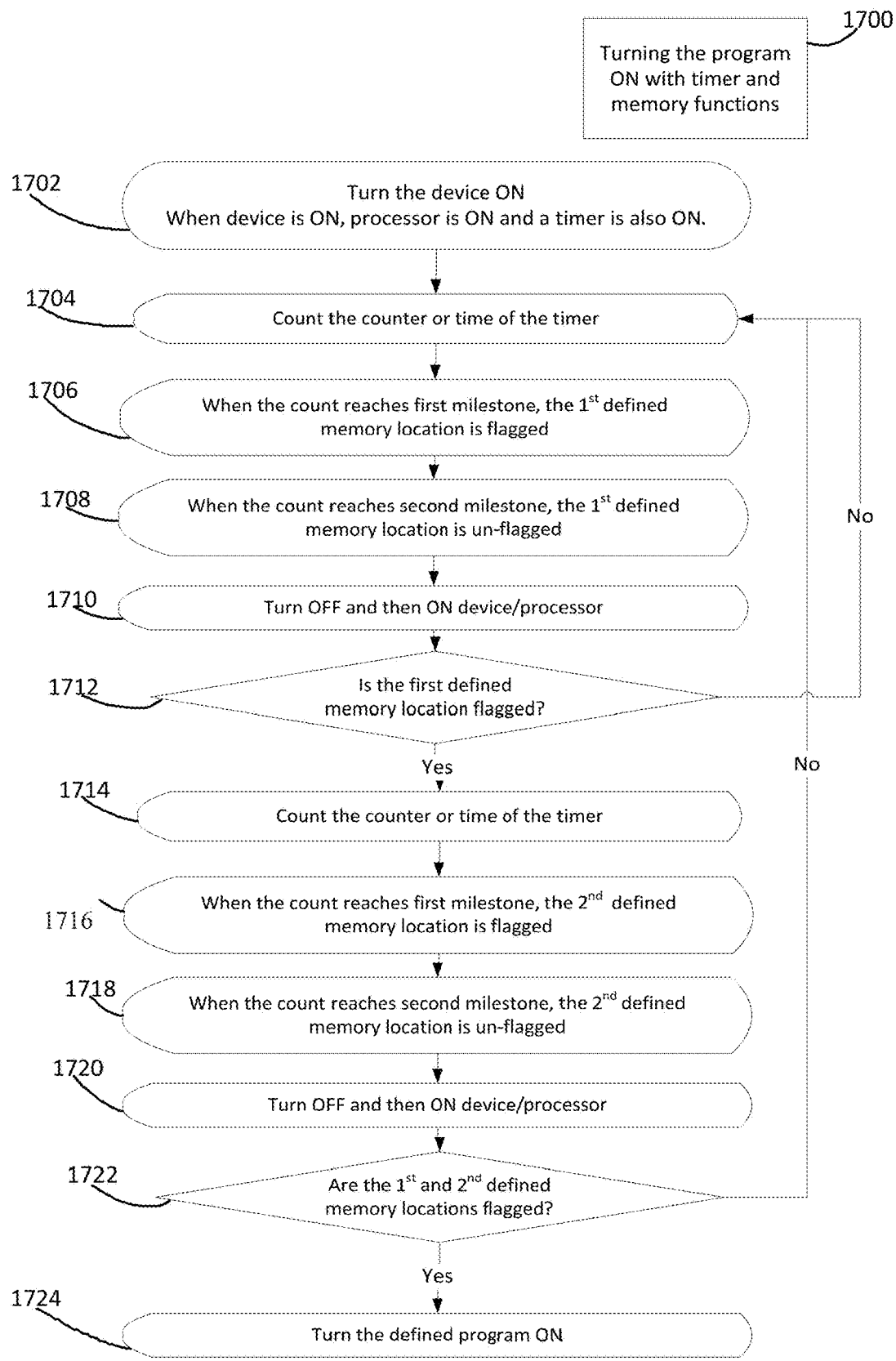
FIG. 17 is a flow chart of a process to turn the program ON using the processor timer in accordance with one embodiment of the present invention.

Similarly and referring to FIG. 17, a flow chart of a process 1700 to turn the program ON using the processor timer in accordance with one embodiment of the present invention is shown. Note that the device can be a wired device, wireless device or standalone device. An example of turning the device with the a specific program can be defined such that when the device is turned ON and OFF twice in a within 2 seconds and 3 seconds for the first time, and again within 3 seconds and 4 seconds for the second time. The algorithm "Turning program on through timer and memory function" 1700 begins in block 1702 when the device is turned ON (when the device is ON, the processor is ON and a timer is also ON). The counter or time of the timer is counted in block 1704. When the count reaches the first milestone, the first defined memory location is flagged in block 1706. When the count reaches the second milestone, the first defined memory location is unflagged in block 1708. The device/processor is turned OFF and then ON in block 1710. If the first defined memory location is not flagged, as determined in decision block 1712, the process loops back to block 1704 where the counter or time of the timer is counted. If, however, the first defined memory location is flagged, as determined in decision block 1712, the counter or time of the timer is counted in block 1714. When the count reaches the first milestone, the second defined memory location is flagged in block 1716. When the count reaches the second milestone, the second defined memory location is unflagged in block 1718. The device/processor is turned OFF and then ON in block 1720. If the first defined memory location is not flagged or the second defined memory location is not flagged, as determined in decision block 1722, the process loops back to block 1704 where the counter or time of the timer is counted. If, however, the first defined memory location is flagged and the second defined memory location is flagged, as determined in decision block 1722, the defined program is turned ON in block 1724.

For example, the process turns a program ON by providing a device having a counter or timer, a memory and a processor communicably coupled to the counter or timer and the memory, wherein the program causes the processor to perform execute one or more commands when the program is ON, (a) determining a count based on the counter or a time based on the timer, (b) flagging a first defined memory location when the count or time reaches a first milestone, (c) un-flagging the first defined memory location when the count or time reaches a second milestone, (d) repeating steps (a) through (v) when the first defined memory location is not flagged, (e) determining the count based on the counter or the time based on the timer, (f) flagging a second defined memory location when the count or time reaches the first milestone, (g) un-flagging the second defined memory location when the count or time reaches the second milestone, (h) turning the device OFF and then ON again, (i) repeating steps (a) through (h) when the first defined memory location is not flagged or the second defined memory location is not flagged, and (p) turning the program ON.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A device comprising:
a counter or timer;
a memory; and
a processor communicably coupled to the counter or timer and the memory, wherein the processor:
(a) for each of one or more defined memory locations:
(i) determines a count based on the counter or a time based on the timer,
(ii) flags the defined memory location when the count or time reaches a first milestone,
(iii) un-flags the defined memory location when the count or time reaches a second milestone,
(iv) determines that the device is turned OFF and then ON again,
(v) repeats steps (i) through (iv) when the defined memory location is not flagged or any previous defined memory locations are not flagged,
(b) repeating steps (i) through (v) until all the defined memory locations have been used and are flagged, and
(c) resets the device or turns a program ON when all the defined memory locations have been used and are flagged.

2. The device as recited in claim 1, further comprising a user interface communicably coupled to the processor, wherein the first milestone, the second milestone, the one or more defined memory locations or other operational parameters are selected using the user interface.

3. The device as recited in claim 1, wherein the device comprises a control device or a lighting device.

4. The device as recited in claim 1, further comprising one or more switches communicably coupled to the processor.

5. The device as recited in claim 4, wherein the one or more switches comprise a push pull switch, a toggle switch, a push button switch, a rotary switch, a resistive/capacitive switch, or a combination thereof.

6. The device as recited in claim 1, further comprising one or more sensors communicably coupled to the processor.

7. The device as recited in claim 6, wherein the one or more sensors comprise an air quality sensor, an ambient light sensor, a temperature sensor, a humidity sensor, a proximity sensor, a motion sensor, a sound sensor or a combination thereof.

8. The device as recited in claim 6, wherein the processor further executes a time division multiplexing or pulsed sense mechanism to activate and deactivate the one or more sensors.

9. The device as recited in claim 1, further comprising a real time clock communicably coupled to the processor.

10. The device as recited in claim 1, further comprising:
a wireless transceiver circuit communicably coupled to the processor; and
an antenna connected to the wireless transceiver circuit.

11. The device as recited in claim 10 further comprising an external control device communicably coupled to the processor of the device via the wireless transceiver circuit and antenna, wherein the external control device provides one or more user interface screens.

12. The device as recited in claim 1, further comprising one or more LED indicators communicably coupled to the processor.

13. The device as recited in claim 1, further comprising:
a housing in which the counter or timer, the memory and the processor are disposed;
a power source disposed in the housing and communicably coupled to the processor;
one or more sensors disposed in the housing and communicably coupled to the processor;
one or more switches disposed in the housing and communicably coupled to the processor;
a wireless transceiver circuit disposed in the housing and communicably coupled to the processor; and
an antenna disposed in the housing and communicably coupled to the wireless transceiver circuit.

14. The device as recited in claim 13, wherein the housing is substantially square having rounded corners, sloped sides and a substantially flat top having rounded sides.

15. The device as recited in claim 14, wherein die one or more switches comprise four switches, each switch is disposed below the substantially flat top proximate to each rounded corner, and each switch is activated by touching or depressing an area of the substantially flat top proximate to the switch.

16. The device as recited in claim 13, wherein the housing comprises:
a base plate;
an outer ring attached to the base plate;
an electronic board disposed within the outer ring and attached to the base plate;

a top cover disposed over the outer ring and attached to the base plate; and wherein the power source, the one or more sensors, the one or more switches, the wireless transceiver circuit, the antenna and the processor are attached to the electronic board.

\* \* \* \* \*